US009549210B2

(12) United States Patent
Gell et al.

(10) Patent No.: US 9,549,210 B2
(45) Date of Patent: *Jan. 17, 2017

(54) CONGESTION INDUCED VIDEO SCALING

(71) Applicant: Wi-LAN Labs, Inc., San Diego, CA (US)

(72) Inventors: David Gell, San Diego, CA (US); Yiliang Bao, San Diego, CA (US); Kenneth L. Stanwood, Vista, CA (US)

(73) Assignee: Wi-LAN Labs, Inc., San Diego, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 14/501,605

(22) Filed: Sep. 30, 2014

(65) Prior Publication Data

US 2015/0016251 A1   Jan. 15, 2015

Related U.S. Application Data

(63) Continuation of application No. 13/644,650, filed on Oct. 4, 2012, now Pat. No. 8,854,958.

(Continued)

(51) Int. Cl.
*G01R 31/08* (2006.01)
*H04N 21/238* (2011.01)
(Continued)

(52) U.S. Cl.
CPC ........ *H04N 21/23805* (2013.01); *H04L 47/20* (2013.01); *H04L 65/4084* (2013.01);
(Continued)

(58) Field of Classification Search
None
See application file for complete search history.

(56) References Cited

U.S. PATENT DOCUMENTS 7,916,659 B2   3/2011 Loiacono et al.
7,974,233 B2   7/2011 Banerjee
(Continued)

FOREIGN PATENT DOCUMENTS

EP   2 262 172 A1   12/2010
WO   2010/112074 A1   10/2010

OTHER PUBLICATIONS

Fitchard. "Examining Intel's conception of the radio access network." Connected Planet. Jun. 16, 2011, 3 pages. Retrieved from http://connectedplanetonline.com/residential_services/news/Examining-Intels-conception-of-the-radio-access-network-0616/.

(Continued)

*Primary Examiner* — Duc C Ho
(74) *Attorney, Agent, or Firm* — Procopio, Cory, Hargreaves & Savitch LLP

(57) ABSTRACT

Access nodes and methods adjust a bit rate of a data stream in a communication network. The access nodes and methods have a packet inspection unit configured to inspect one or more of the data packets to determine that the data stream includes video data. A congestion unit is coupled to the packet inspection unit and is configured to determine a level of congestion in the communication network, the level of congestion associated with a capacity of the wireless channel, the level of congestion capable of varying over time, and the capacity of the wireless channel capable of varying with the level of congestion. A video scaling unit is configured to adjust the bit rate of the data stream responsive to the packet inspection unit and the congestion unit.

29 Claims, 12 Drawing Sheets

Related U.S. Application Data

(60) Provisional application No. 61/579,324, filed on Dec. 22, 2011.

(51) Int. Cl.
| | |
|---|---|
| *H04N 21/2343* | (2011.01) |
| *H04N 21/414* | (2011.01) |
| *H04N 21/61* | (2011.01) |
| *H04N 21/6437* | (2011.01) |
| *H04N 21/647* | (2011.01) |
| *H04L 12/813* | (2013.01) |
| *H04L 29/06* | (2006.01) |
| *H04N 21/6373* | (2011.01) |
| *H04L 12/815* | (2013.01) |
| *H04L 12/801* | (2013.01) |

(52) U.S. Cl.
CPC ............ *H04L 65/605* (2013.01); *H04L 65/80* (2013.01); *H04N 21/23439* (2013.01); *H04N 21/41407* (2013.01); *H04N 21/6131* (2013.01); *H04N 21/6181* (2013.01); *H04N 21/6373* (2013.01); *H04N 21/6437* (2013.01); *H04N 21/64738* (2013.01); *H04N 21/64769* (2013.01); *H04L 47/11* (2013.01); *H04L 47/14* (2013.01); *H04L 47/22* (2013.01)

(56) References Cited

U.S. PATENT DOCUMENTS

| | | |
|---|---|---|
| 8,472,520 B2 | 6/2013 | Banerjee |
| 8,526,449 B2 | 9/2013 | Rugel |
| 8,588,063 B2 * | 11/2013 | Van Leekwijck ... H04L 12/5695 370/229 |
| 2003/0179720 A1 | 9/2003 | Cuny |
| 2004/0071086 A1 * | 4/2004 | Haumont ............ H04L 12/5602 370/230 |
| 2007/0008884 A1 * | 1/2007 | Tang ...................... H04L 29/06 370/230 |
| 2007/0133405 A1 | 6/2007 | Bowra |
| 2008/0056302 A1 | 3/2008 | Erdal et al. |
| 2009/0154353 A1 | 6/2009 | Loiacono et al. |
| 2012/0155398 A1 | 6/2012 | Oyman et al. |
| 2012/0163203 A1 | 6/2012 | Wilkinson et al. |
| 2012/0260296 A1 | 10/2012 | Mallet et al. |
| 2013/0086279 A1 * | 4/2013 | Archer ................... H04L 69/14 709/233 |

OTHER PUBLICATIONS

Schulzrinne et al. "RTP Profile for Audio and Video Conferences with Minimal Control." The Internet Society. RFC 3551. Jul. 2003, 38 pages.

Felix. "Introduction to Video Transcoding of MCLAB Seminar Series." 42 pages. Date unknown.

Ortiva Wireless, Inc.. "Defining Quality of Experience for Video Delivered over Mobile Networks." 4 pages. Date unknown.

CISCO Systems, Inc. "Optimizing Enterprise Video Over Wireless LAN." White Paper, 11 pages. 2010.

Tthe Invitation to Pay Additional Fees, and Where Applicable, Protest Fee for related PCT Application No. PCT/US2012/063400, mailed Feb. 21, 2013, in 7 pages.

The International Search Report and Written Opinion for related PCT Application No. PCT/US2012/063400, mailed Jul. 5, 2013, in 15 pages.

* cited by examiner

CONGESTION INDUCED VIDEO SCALING

CROSS-REFERENCE TO RELATED APPLICATIONS

This application is a continuation of U.S. patent application No. 13/644,650, filed Oct. 4, 2012, which claims the benefit of U.S. Provisional Application No. 61/579,324, filed Dec. 22, 2011, all of which are hereby incorporated by reference.

FIELD OF THE INVENTION

The present invention relates generally to communication systems and, more particularly to the optimization of system performance using application information and link congestion information to trigger video scaling in multiple-access communication systems.

BACKGROUND

In a communication network, such as an Internet Protocol (IP) network, each node and subnet has limitations on the amount of data which can be effectively transported at any given time. In a wired network, the limitations are often a function of equipment capability. For example, a Gigabit Ethernet link can transport no more than 1 billion bits of traffic per second. In a wireless network the capacity is limited by the channel bandwidth, the transmission technology, and the communication protocols used. A wireless network is further constrained by the amount of spectrum allocated to a service area and the quality of the signal between the sending and receiving systems. Because the impact of these limiting aspects can be dynamic, the capacity of a wireless system may vary over time and the system therefore can be thought of as constrained by these varying limitations. Changing levels of congestion over time is often a key cause of the time varying capacity characteristics.

In capacity constrained, multiple-access communication system, two goals are omnipresent: the successful transfer of information at the rate necessary to achieve quality goals, and the minimization of the impact of such transmissions on the ability of the system to adequately service other transfers, which impact may result in delays or disruptions. Often these goals are in conflict with each other, and are complicated by changing conditions such as congestions. Thus addressing the need to service competing concerns represents an opportunity for system optimization.

Problems can arise in attempting to attain the goal of efficient transfer on a per user basis, while simultaneously attempting to ensure that efforts to service one user do not compromise efforts to similarly serve other system users. A reduction in the quality of the user experience for one user can result when efforts to provide service to another user are imbalanced or are complicated by factors such as congestion. Accordingly, success in transferring information may be judged by how the user experiences the transfer. That is, the quality of the user experience can be a metric for judging successful transfer of information. A communication system can generally improve the user experience by avoiding disruptions or delays in the services provided to the user. Along with the time varying changes in the capacity of network, the communication characteristics that provide a positive user experience may also vary with the type of application associated with the information transfer and the level of congestion in the network. For example, for an email application, delay in delivering part of a message to the user due to congestion is preferred to failing to deliver part of the message. For video delivering modified video may be preferable to delaying delivery of all or a portion of the video, interrupting delivery of the video, or the like because of congestion or other changes to capacity or channel related characteristics As video delivery represents a large use of bandwidth in a communications system, and as video often has greater quality expectations on the part of the user than voice data, email data, or the like, there is a need for improved solutions for addressing congestion and determining a response to mitigate the congestion while maintaining or optimizing the quality of experience of the applications running in the communications system, including those that generate and transfer video data.

SUMMARY

Systems and methods for adjusting a bit rate of a data stream in a communication network are provided.

In one aspect a method for adjusting a bit rate of a data stream in a communication network where the data stream including data packets for transfer over a wireless channel, is provided. The method includes determining that the data stream includes video data; determining a level of congestion in the communication network, the level of congestion associated with a capacity of the wireless channel, the level of congestion capable of varying over time, and the capacity of the wireless channel capable of varying with the level of congestion; and if the data stream is determined to include video data and the determined level of congestions is at or above a predetermined level of congestion, adjusting the bit rate of the data stream so that the data packets can be transferred over the wireless channel in accordance with the capacity.

In a further aspect, if the congestion level is determined to be at or above the predetermined level of congestion the bit rate is adjusted downward in accordance with the capacity; and if the congestion level is determined to be below the predetermined level of congestion, the bit rate is adjusted upward in accordance with the capacity.

In another aspect an access node that adjusts a bit rate of a data stream in a communication network, the data stream including data packets for transfer over a wireless channel, is provided. The access node has a packet inspection unit configured to inspect one or more of the data packets to determine that the data stream includes video data; a congestion unit coupled to the packet inspection unit, the congestion unit configured to determine a level of congestion in the communication network, the level of congestion associated with a capacity of the wireless channel, the level of congestion capable of varying over time, and the capacity of the wireless channel capable of varying with the level of congestion; and a video scaling unit coupled to the packet inspection unit and the congestion unit, the video scaling unit configured to adjust the bit rate of the data stream responsive to the packet inspection unit and the congestion unit. Further, the bit rate of the data stream is adjusted if the data stream is determined to include video data and the level of congestions is determined to be at or above a predetermined level of congestion, the bit rate of the data stream adjusted so that the data packets are transferred over the wireless channel in accordance with the capacity.

In another aspect an eNodeB in a long term evolution (LTE) network is provided that adjusts a bit rate of a data stream in the LTE network, the data stream including data packets for transfer over a wireless channel. The eNodeB comprises a backhaul interface unit, the backhaul interface unit configured to receive the data packets; a data application unit coupled to the backhaul interface unit; and an LTE protocol unit including one or more layers of an LTE protocol stack coupled to the data application unit. The data application unit is configured to: determine that the data stream includes video data; and adjust the bit rate of the data stream responsive to a level of congestion in the LTE network.

In a further aspect an apparatus for scaling a video stream for transfer on a communication channel in a network is provided. The apparatus comprises an access node coupled to the network; a packet gateway coupled to the access node and the network; and a video scaling unit coupled to the packet gateway, the access node, and the network. The video scaling unit is configured to: receive a trigger from the access node; process the trigger to determine a desired data rate for transferring the video stream on the communication channel; and scale the bit rate of the video stream around the desired data rate based on a capacity of the communication channel.

Other features and advantages of the present invention should be apparent from the following description which illustrates, by way of example, aspects of the invention.

DETAILED DESCRIPTION

As will be set forth in greater detail herein below, systems and methods disclosed herein in accordance with various exemplary embodiments, can be applied, implemented or otherwise used in association with various communication systems, such as capacity-limited communication systems, including but not limited to wireline and wireless technologies. For example, various exemplary and alternative exemplary embodiments are applicable to communication standards such as Cellular 2G, 3G, 4G (including Long Term Evolution ("LTE"), LTE Advanced, WiMax), WiFi, Ultra Mobile Broadband ("UMB"), cable modem, and other wireline or wireless technologies. Although the phrases and terms used herein to describe specific embodiments can be applied to particular technologies or standards, embodiments described herein are not limited only to these specific standards. It will be appreciated that in certain instances, various exemplary embodiments can be broadly applied to other standards, technologies and implementations not specifically disclosed or described herein.

Figure 1:
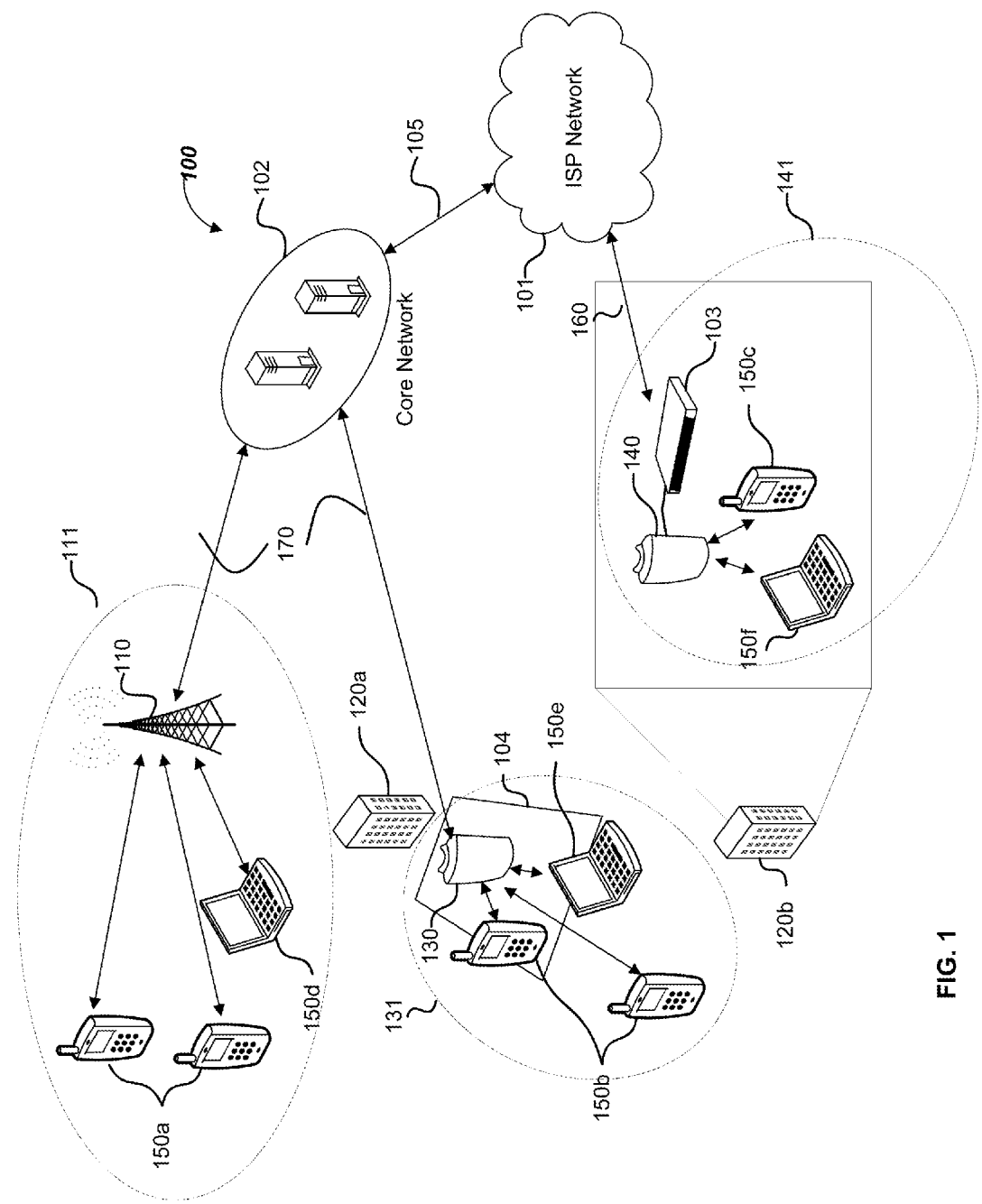
FIG. 1 is a block diagram illustrating a wireless communication network in which systems and methods, as disclosed herein, can be implemented according to an exemplary embodiment.

According to an embodiment, a deployment of a communication system that includes macrocells 110, picocells 130, and enterprise femtocells 140 is illustrated in FIG. 1. In an exemplary deployment, the macrocells can transmit and receive on one or many frequency channels that are separate from the one or many frequency channels used by base stations such as small form factor (SFF) base stations including picocells and enterprise or residential femtocells. Such configurations can make use of self-organizing network protocols that may fall within the scope of the embodiments discussed and described herein. In other embodiments, the macrocells and the SFF base stations can share the same frequency channels. It will be appreciated by one of skill in the art that challenges can be presented in that various combinations of geography and channel availability can create a variety of interference scenarios that can have impact on the throughput, and therefore, capacity of the entire communications system.

An example of a typical macrocell 110, picocell 130 and enterprise femtocell 140 deployment in a communications network 100 is shown in FIG. 1. Macro base station 110 can be connected to a core network 102 through a backhaul connection 170. Subscriber stations (SS) 150 and 150d can connect to the network through macro base station 110. It should be noted that subscriber stations can be referred to in the alternative as, for example, mobile devices, mobile stations (MS), user equipment (UE), customer premise equipment (CPE), user device or simply user. In the network configuration illustrated in FIG. 1, office building 120a causes a coverage shadow 104. It will be appreciated by one of skill in the art that a coverage shadow can be caused by buildings, geographic and terrain features, weather, and other objects or phenomena. To address the potential impact on service and/or service quality, pico station 130, which is connected to core network 102 via backhaul connection 170, can be positioned so as to provide coverage to subscriber stations 150b and 150e in coverage shadow 104. It will be further appreciated that pico station 130 may be positioned such that the coverage area would extend somewhat to or into office building 120a.

Inside or around an exemplary office building 120b, enterprise femtocell 140 is intended to provide in-building coverage to subscriber stations 150c and 150f. It will be appreciated that it is possible for the coverage of enterprise femtocell 140 to extend somewhat outside office building 120b and, further, there may be areas within office building 120b that may not be subject to coverage for various reasons. Enterprise femtocell 140 can connect to core network 102 via Internet service provider (ISP) network 101 by utilizing broadband connection 160 provided by enterprise gateway 103. It will also be appreciated that ISP network 101 may be connected to core network 102 through various conventional means that would be understood by those of ordinary skill in the art.

Figure 2:
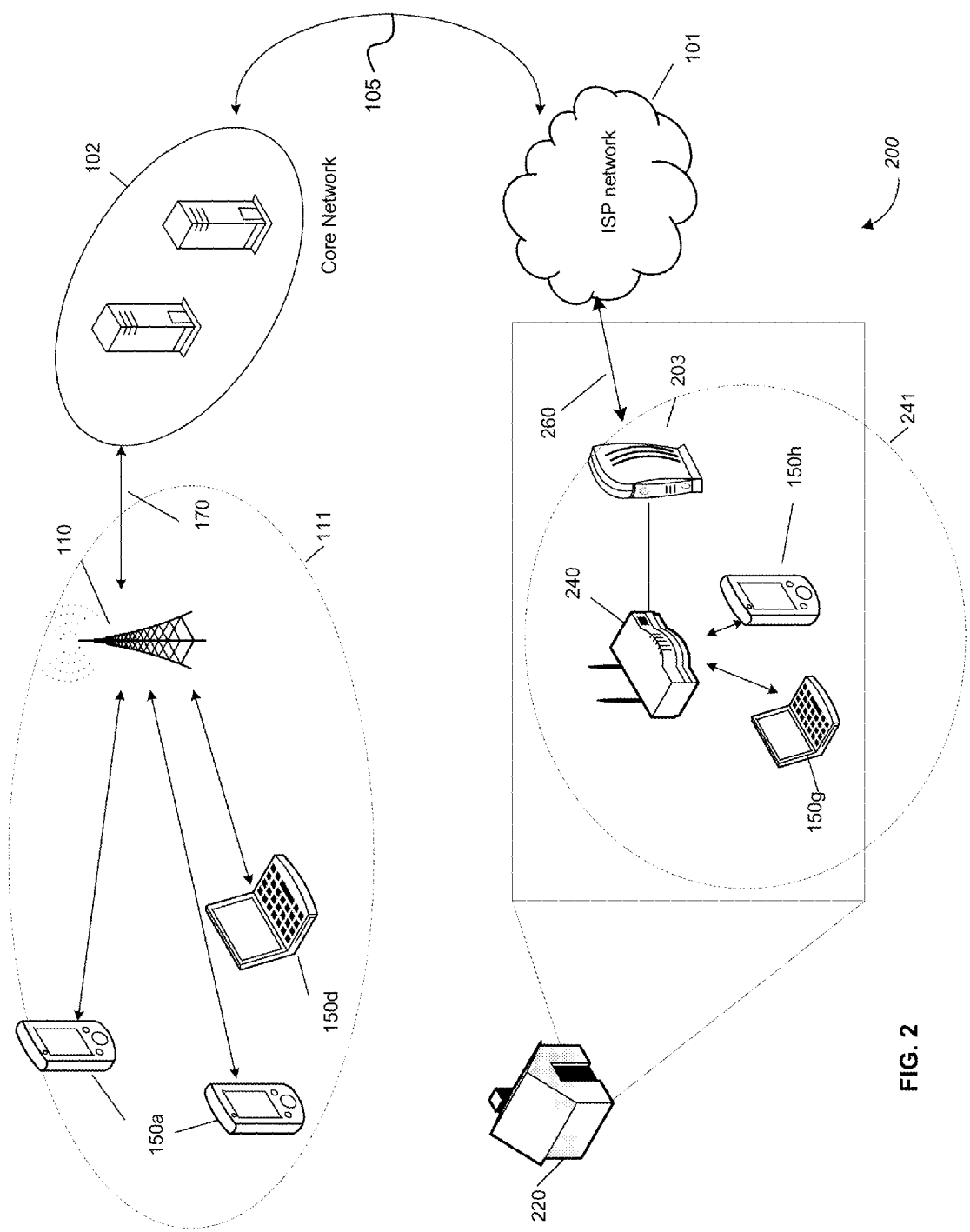
FIG. 2 is block diagram illustrating a wireless communication network in which systems and methods, as disclosed herein, can be implemented according to an exemplary alternative embodiment.

According to an alternative exemplary embodiment as illustrated in FIG. 2, a communications network 200 can include macrocells 110 and residential femtocells 240 that can be deployed in a residential environment. Macrocell base station 110 can be connected to core network 102 through backhaul connection 170. Subscriber stations 150a and 150d can connect to the network through macro base station 110. Inside residences 220, residential femtocell 240 can provide in-home coverage to subscriber stations 150g and 150h. Residential femtocells 240 can connect to core network 102 via ISP network 101 by utilizing broadband connection 260 provided by cable modem or DSL modem 203. As noted hereinabove, ISP network 101 can be connected to core network 102 in one of a variety of manners understood by those of ordinary skill in the art. It will also be understood that while residential femtocell 240 may serve subscriber stations 150g and 150h inside the residences 220, the coverage of femtocell 240 may extend somewhat outside residence 220.

Figure 3:
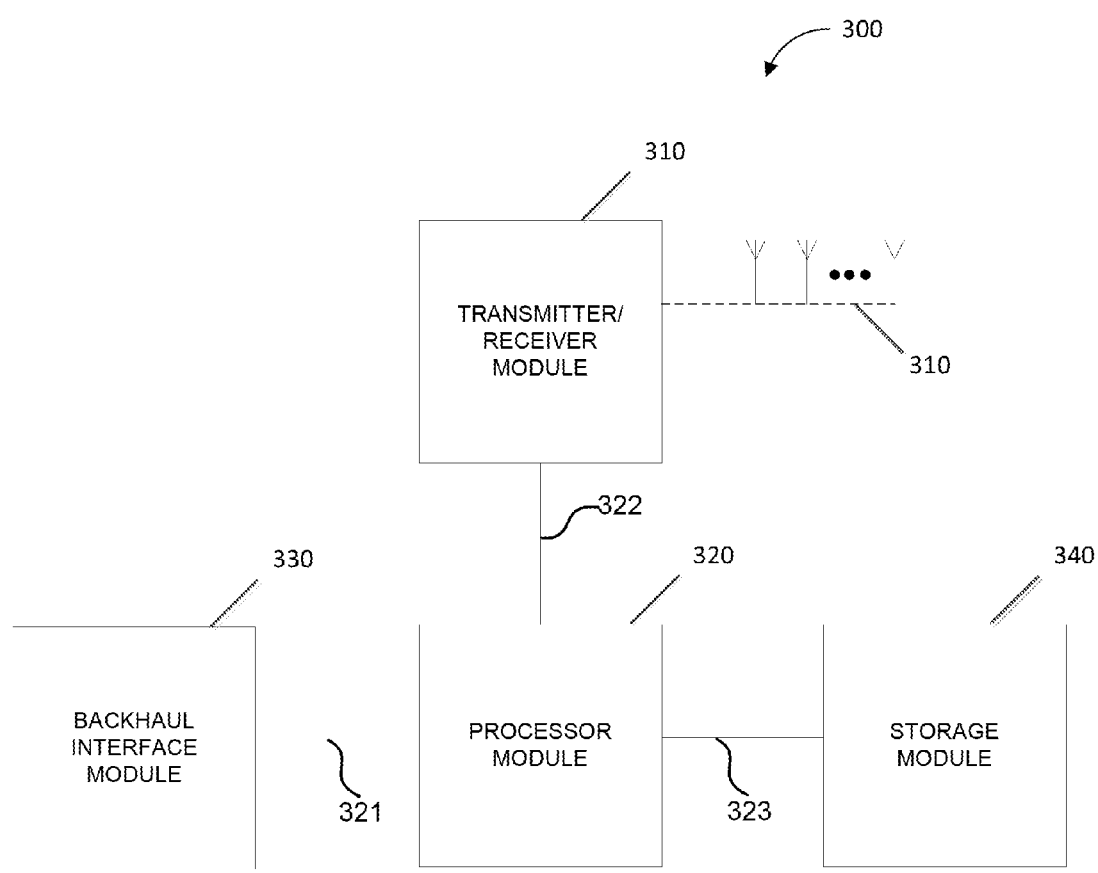
FIG. 3 is a functional block diagram illustrating an access node according to an exemplary embodiment.

In accordance with some exemplary and alternative exemplary embodiments, an illustrative access node 300 is shown in FIG. 3. It will be appreciated that access node 300 can be a mobile WiMAX base station, a GSM wireless base transceiver station (BTS), a Universal Mobile Telecommunications System (UMTS) NodeB, an LTE evolved Node B, such as an "eNB" or "eNodeB", a cable modem head end, or other wireline or wireless access node, or the like, capable of having any of a variety of form factors including, but not limited to, for example, form factors associated with macro base station 110, pico station 130, enterprise femtocell 140, or residential femtocell 240 shown in FIG. 1 and FIG. 2. The access node 300 can include a processor module 320 communicatively coupled to, for example, a transmitter receiver module 310 through a connection 322, to a backhaul interface module 330 through a connection 321, and to a storage module 340 through a connection 323. It will be appreciated that connections 321, 322, and 323 may be any of a variety of connections such as a bus connection, serial connection, or the like as would be known to one of skill in the art. The transmitter receiver module 310 can be configured to transmit and receive various types of communications with other devices according to, for example, communications protocols, standards, or the like. In accordance with various exemplary embodiments involving wireless transmission, the access node 300 can include one or more antennae 301 for transmission and reception of radio signals.

In other exemplary or alternative exemplary embodiments, the access node 300 can transmit and receive communications via another communication channel or channels in addition to channels associated with the transmitter receiver module 310. For example, communications received via the transmitter receiver module 310 in a base station may be transmitted, after processing, on a backhaul connection 331, which can be, for example, a standard backhaul connection 170 shown in FIG. 1 or other type of backhaul connection as would be appreciated by one of ordinary skill in the art. Similarly, communication received from the backhaul connection 331 may be transmitted by the transmitter receiver module 310. Backhaul interface module 330 facilitates transmitting and receiving with other nodes, devices, or the like that are accessible on the backhaul connection 331.

The processor module 320 can be configured to process communications being received and transmitted by the access node 300. The storage module 340 can be configured to store data for use by the processor module 320. In some embodiments, the storage module 340 can also be configured to store computer readable instructions, which, when read and executed by the processor module 320 can accomplish various functionality described herein with respect to the access node 300. In an embodiment, the storage module 340 includes a non-transitory machine readable medium which can include but is not limited to primary and secondary storage media, rotating storage media, removable storage media, and one or more semiconductor memory packages, or other memory packages, or the like as would be appreciated by one of ordinary skill For the purpose of explanation, various exemplary and alternative exemplary embodiments associated with the access node 300 such as, for example, the macro base station 110, pico station 130, enterprise femtocell 140, or residential femtocell 240 shown in FIG. 1 and FIG. 2, are described as having certain functionality. It will be appreciated that in accordance with various exemplary embodiments, the functionality can be carried out or accomplished using the processor module 320 in association with the storage module 340, transmitter receiver module 310, and backhaul interface module 330 or any operable set, subset or combination thereof.

Figure 4A:
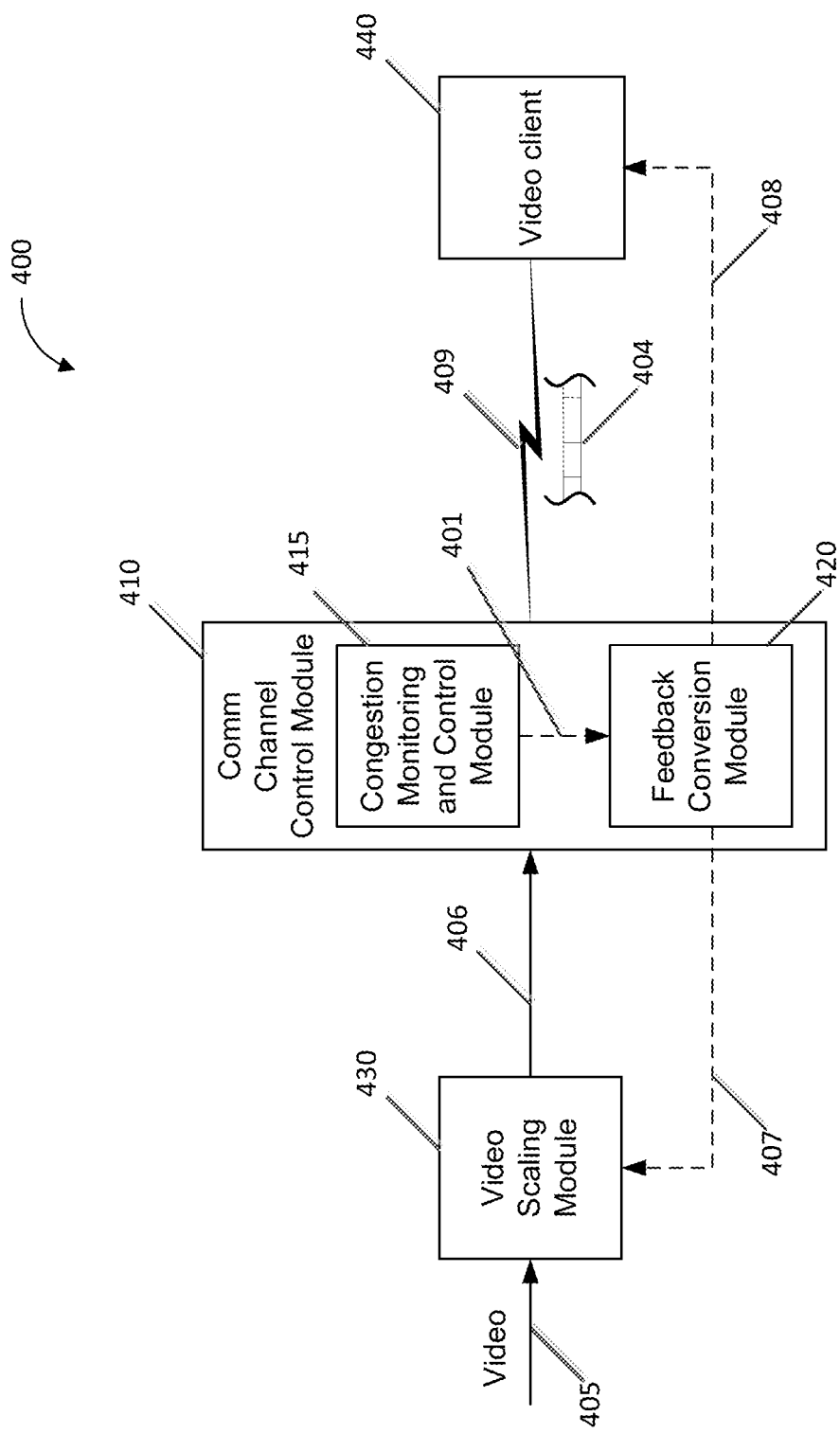
FIG. 4A is a block diagram illustrating a system associated with congestion-triggered scaling of downlink video according to an exemplary embodiment.

FIG. 4A is a block diagram of a system for congestion triggered scaling of video associated with a downlink according to an embodiment. Comm channel control module 410 controls the operation of and access to a channel such as, for example, a channel 409 and monitors it for congestion including reasons for congestion, contributing factors to congestion, and the like. It will be appreciated that a channel can refer to a channel that, for a variety of reasons, is constrained in capacity, and is thereby not always able to accommodate a given capacity to support a given desired video rate. In some cases, channel capacity can be constrained by reaching a maximum capacity whereby demands for additional capacity cannot be met. In other examples, the capacity can be constrained by conditions other than reaching a maximum capacity, such as when the need to use less efficient modulation and coding schemes reduce the capacity from the maximum capacity to a lower capacity. Comm channel control module 410 can be embodied in or can be an embodiment of access node 300 which may be a wireless access node such as, for example, macro base station 110, pico station 130, enterprise femtocell 140, or residential femtocell 240 shown in FIG. 1 and FIG. 2, or the like, or a wired access node such as a cable modem head end, or the like. Comm channel control module 410 can pass video data 404 to one or more video clients 440 over channel 409. In an embodiment, video client 440 may be part of or reside in UE 150, such as, for example, when UE 150 is a mobile handset, device, or the like with video capability. In an alternative embodiment, video client 440 may be external to UE 150, but communicatively coupled to comm channel control module 410 via UE 150, such as, for example, when UE 150 is a wireless dongle and video client 440 resides on another device, including, for example, a laptop or other device configured to accept a wireless dongle, or communicatively coupled to another device configured to either accept a wireless dongle or with built-in wireless capability. It will be appreciated that while configurations including a mobile handset or a wireless dongle or the like has been described, there are many possible permutations and combinations of devices that would fall within the scope of the embodiments as discussed and described herein.

To better understand the operation in accordance with various embodiments, video scaling module 430 can receive video data 405 such as live video data or streaming video data generated from a video source and can scale the video data 405 based on criteria such as frame size, resolution, maximum bit rate, or the like, which criteria, for example, can be controlled, and can pass the scaled video data to comm channel control module 410 over link 406. Video scaling module 430 may scale the video data 405 using any of a number of methods including those that would be known to those of skill in the art. In an embodiment, video scaling module 430 has access to raw video data and scales the video data 405 by encoding using a set of parameters chosen to meet selected criteria such as frame size, resolution, maximum bit rate, or the like. If a different bit rate of video is desired, either higher or lower, video scaling module 430 encodes the video data 405 using different parameters. In another embodiment, video scaling module 430 has access to a stream of video data 405 that has already been encoded. If a different bit rate of video is desired, either higher or lower, video scaling module 430 transcodes the video to achieve the desired bit rate. In another embodiment, video scaling module 430 has access to multiple copies of the video stream previously encoded with different encoder parameters, resulting in different bit rates. If a different bit rate of video is desired, either higher or lower, video scaling module 430 ceases transmitting video data from the current instance of the video stream encoded at a first given rate and commences transmitting video data associated with an instance of the video stream encoded such that the data rate more closely matches the desired data rate. It will be appreciated that in the present and other embodiments, the term scaling can mean, but is not limited to, changing a scale of a parameter, or can be used generally to mean adjusting or the like, and can refer, but is not limited to, a direct adjustment, acts associated with adjusting, acts that cause adjusting to be carried out, changing a rate, selecting from a variety of available rates and the like.

The scaled video passes from video scaling module 430 to comm channel control module 410 over link 406. It will be appreciated that, in accordance with various exemplary and alternative exemplary embodiments, the placement of the video scaling module 430 can be flexible. In an embodiment, video scaling module 430 resides at the raw video content source. In another embodiment, video scaling module 430 resides where encoded copies of the video are stored. In another embodiment, video scaling module 430 resides in an access node 300. In another embodiment, the video scaling module 430 resides in a core network node, such as an LTE packet gateway (P-GW). One skilled in the art would understand that video scaling module 430 may reside in many places in a network between the video source and the portion of comm channel control module 410 such as, for example, transmitter/receiver module 310 that transmits data to video client 440 over channel 409.

It should be noted that in accordance with exemplary and alternative exemplary embodiments, link 406 can be differently configured depending upon the network topology between video scaling module 430 and comm channel control module 410. In an embodiment where video scaling module 430 resides or is otherwise embodied in a content delivery network (CDN) and the comm channel control module 410 resides in a wireless bases station such as macro base station 110, pico station 130 as shown in FIG. 1, or the like, link 406 could comprise an access link to the Internet for the CDN, that includes some number of hops between routers in the Internet, passage through a packet gateway or other gateways in a core network associated with a wireless operator and a backhaul, such as backhaul connection 170 from FIG. 1, to an access node 300. In an alternative embodiment, video scaling module 430 may reside in a packet gateway in a core network associated with a wireless operator. In such a case, link 406 can be the link between the packet gateway and an access node 300 which would typically include a backhaul. In accordance with other exemplary or alternative exemplary embodiments, video scaling module 430 may be a transcoder or other video scaling device or logic embedded in an access node 300. In such an embodiment or embodiments, link 406 can be an internal path between the video scaling module and logic that controls the transmission of data over channel 409.

Comm channel control module 410 can include congestion monitoring and control module 415 and feedback conversion module 420. It will be understood by one skilled in the art that in addition to circuits, modules, logic, or the like associated with various exemplary and alternative exemplary embodiments discussed and described herein, comm channel control module 410 may contain other circuits, modules, logic, or the like for operations normally associated with access node 300 or may be associated with other circuits, modules, logic, or the like that would support the operations normally associated with access node 300. Congestion monitoring and control module 415 monitors channel 409 to determine if congestion is occurring. Determination of congestion may be carried out in many ways and be supported by various means or circuits, modules, logic, or the like, which may be embodied individually or partially or fully together. Each UE 150 communicating with an access node 300 will typically have, at a given time, a designated or given physical layer (PHY) operating mode. Examples of the PHY operating mode may include but are not limited to a modulation and coding scheme, which can be chosen and modified based upon link quality metrics measured with respect to channel 409, or a portion of the channel, between access node 300 and UE 150. Such metrics may be obtained by a storage, monitoring or measuring function associated with transmitter/receiver module 310 in access node 300 or by a similar storage, monitoring or measuring function in UE 150 and may also be derived from measurements or statistics obtained by these or other functions of the UE 150 or access node 300. Such metrics may include, but are not limited to, signal to noise ratio (SNR), received signal strength indicators (RSSI), carrier to interference plus noise ratio (CINR), bit error rate (BER), retransmission counts, or the like. The choice of PHY operating mode determines how much of the capacity of channel 409 is necessary to transmit a given quantity of data. For instance, if all other PHY mode parameters are the same, if communication between an access node 300 and UE 150 uses quadrature phase shift key (QPSK) modulation it will require three time as much of the capacity of channel 409 compared to if it uses 64 level quadrature amplitude modulation (64-QAM). In an embodiment, congestion monitoring and control module 415 monitors the PHY operating mode of each UE at a given time and calculates available system capacity based on a function of the PHY operating modes and the data rate needs, commitments, or demands of the services operating on the UEs. Such a function is described in detail in U.S. Pat. No. 7,023,798 which is incorporated herein by reference. As PHY operating modes change, for instance due to mobility, or as the data rate needs or commitments for the various services changes, or the like, congestion monitoring and control module 415 determines whether or not the channel 409 is congested, such as, for example, by meeting given congestion criteria associated with the above described, or other congestion related metrics.

Alternatively, or in addition to the above described embodiments, congestion monitoring and control module 415 may monitor the depth of queues or buffers used to store data prior to deciding which data to transmit over channel 409 at what time and in what order. Such queues may, for instance, reside in storage module 340 of an access node 300. It will be appreciated as one example of congestion monitoring, that when queues reach a capacity threshold, or when queues overflow, congestion is considered to be occurring. Once queue occupancy drops below a capacity threshold, congestion is considered to no longer be occurring.

In some systems, individual UEs may have capacity constraints independent of the capacity constraints of channel 409. User equipment may be constrained by service level agreements that cap maximum bandwidth for the individual user or groups or classes of users. Alternatively, service provider policy may dictate that an individual UE receive at most a certain percentage of the capacity of channel 409, possibly weighted by the number of active UE units or some other criteria. In both cases, congestion may be defined as congestion of link 409, congestion of an individual UE's allotted capacity, or a combination of both.

In an embodiment, congestion monitoring and control module 415 predicts when congestion is about to occur or is likely to occur. For instance, if the signal quality from a user device is degrading, it may be assumed that the user device is moving away from the access node, or that there may be an increase in interference from another neighboring device or cell. Congestion monitoring and control module 415 may predict congestion and proactively take actions, such as congestion reducing actions before the congestion occurs such as, for example, before the congestion reaches a threshold level, measured value of a metric, or the like, so as to minimize quality degradation that would ultimately occur if the congestion actually reached or exceeded, for example, a threshold level, or the like, and thereafter addressing the resulting congestion.

When congestion monitoring and control module 415 detects congestion on channel 409 or in a portion of channel 409 associated with a specific UE, a number of actions by congestion monitoring and control module 415 are possible. Congestion monitoring and control module 415 may apply admission control and suspend, restrict or otherwise degrade already admitted services and may deny admission of un-admitted services. One skilled in the art would understand that such admission control may be integral to congestion monitoring and control module 415 or may be located in a separate module in access node 300 or elsewhere in the network such as in a packet gateway.

In an embodiment, congestion monitoring and control module 415 passes control information to feedback conversion module 420. Feedback conversion module 420 determines, under the present congestion related conditions, whether congestion may be mitigated via scaling video stream to a lower rate. Conversely, if congestion monitoring and control module 415 determines that congestion has been alleviated, such as is indicated when a user device changes to a more efficient modulation and coding, the information regarding alleviation of congestion may be passed to feedback conversion module 420, which can determine whether video may be scaled to a higher rate. Feedback conversion module 420 converts congestion information into actions associated with video scaling directed at adapting video scaling to the present level of congestion thereby reducing congestion, reducing the impact of a congestion causing event, or taking advantage of surplus capacity arising from a reduction in congestion.

In an embodiment, a control path 407 between feedback conversion module 420 and video scaling module 430 may allow requests or commands to be sent to scale the video stream to a different rate. Path 407 may be implemented as part of the reverse direction of path 406, or may be embodied as a separate control information path including, for example, a bidirectional path, or the like.

In an alternative embodiment, feedback conversion module 420 may not have the ability to directly command or make requests of video scaling module 430. In such a case, feedback conversion module 420 can cause video client 440 to request a different video rate from video scaling module 430. Some video clients 440 contain logic that monitors the flow of received video. Based on the video detection methods described below, comm channel control module 410 can be aware of or be made aware of through interaction with specific components thereof or other components, whether a particular video client 440 specifically reacts to video or other packet flow at one rate resulting in a request for an increase or a decrease in the video rate. Comm channel control module 410, based on determinations by feedback conversion module 420, may constrain the flow of video to video client 440, triggering a request for a lower rate from video scaling module 430. Conversely, the flow of video to the video client 440 may be relaxed by comm channel control module 410, triggering video client 440 to request an increased video rate from video scaling module 405.

In an alternative embodiment a UE application (app) is associated with or part of video client 440 and is capable of communicating with feedback conversion module 420 over a control path 408. In such a case, feedback conversion module 420 may directly, or in association with a related or supporting function in comm channel control module 410, command or request the application associated with video client 440, via control channel 490, to further request or command video scaling module 430 to change the video rate.

One skilled in the art will understand that control channel 408 may be carried over channel 409 and that a request, message, command, or the like, sent from video client 440 to video scaling module 405, regardless of the manner of triggering or otherwise causing the request, message, command or the like to be made, may be carried over a combination of channel 409 and 409. Comm channel control module 410 directly or in association with other logic in access node 300 may inspect such commands and requests from video client 440 to video scaling module 430 to ensure that the intended action is successfully triggered. If the intended action does not occur, Comm channel control module 410 may reapply the mechanism intended to trigger the action or may use a different means to mitigate congestion.

Figure 4B:
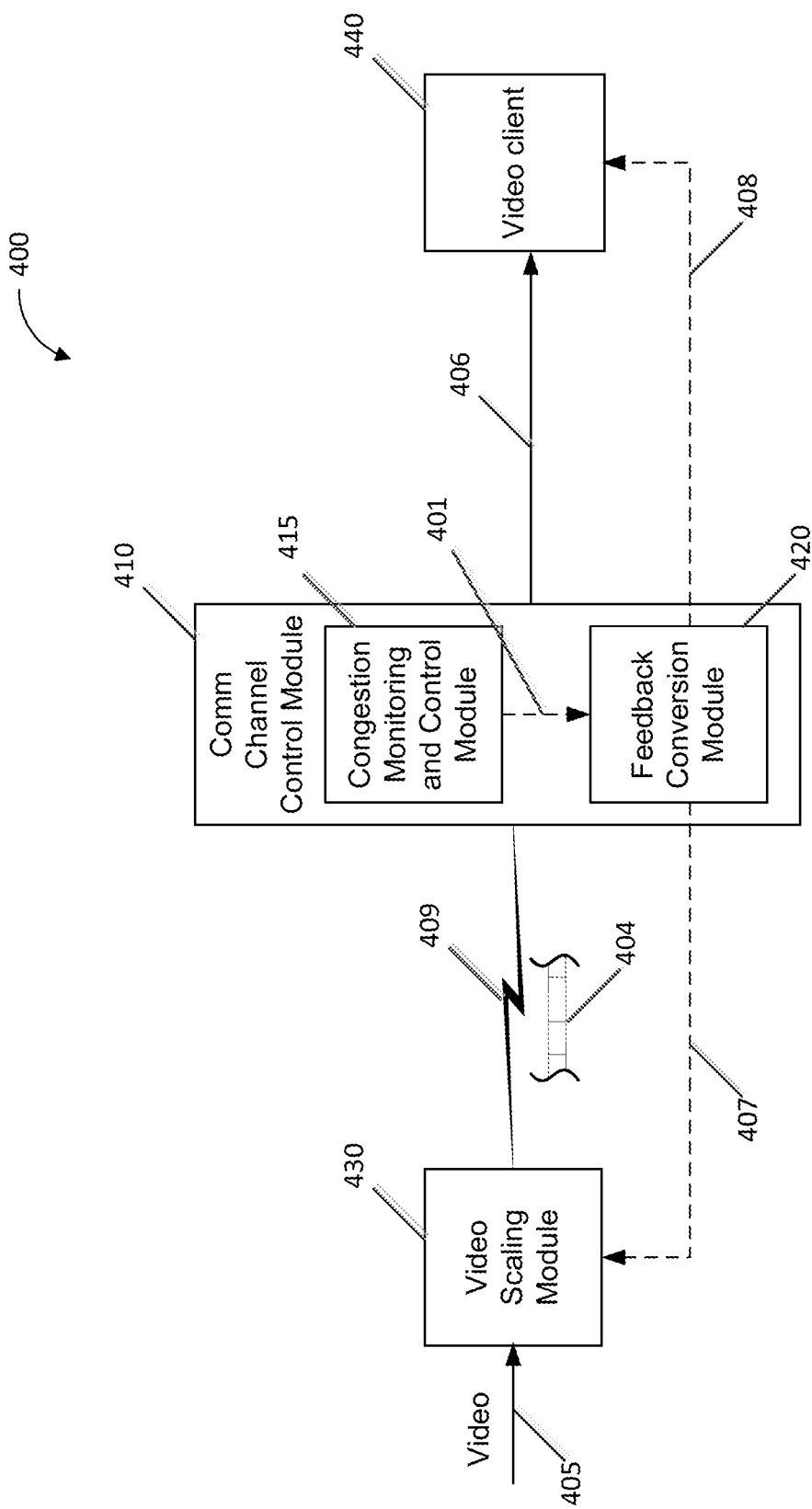
FIG. 4B is a block diagram illustrating a system associated with congestion-triggered scaling of uplink video according to an exemplary embodiment.

FIG. 4B is a block diagram of a system for congestion triggered scaling of video associated with an uplink. In an embodiment, channel 409, which can be a capacity constrained channel, provides a link between video scaling module 430 and comm channel control module 410. Such a configuration can be understood by one of ordinary skill in the art to be present when, for example, video scaling module 405 is contained in or associated with a user device that performed or enabled video surveillance. Alternatively, video scaling module 430 could be incorporated into a video enabled smart phone, laptop, or other user device. It should be noted that the detection of congestion and the methods for triggering scaling described with respect to FIG. 4A apply to FIG. 4B. One skilled in the art would understand that the system for congestion triggered scaling of uplink video shown in FIG. 4B and the system for congestion triggered scaling of downlink video shown in FIG. 4A are not mutually exclusive and can be independently implemented but may further be implemented in the same system and operate concurrently.

Figure 5:
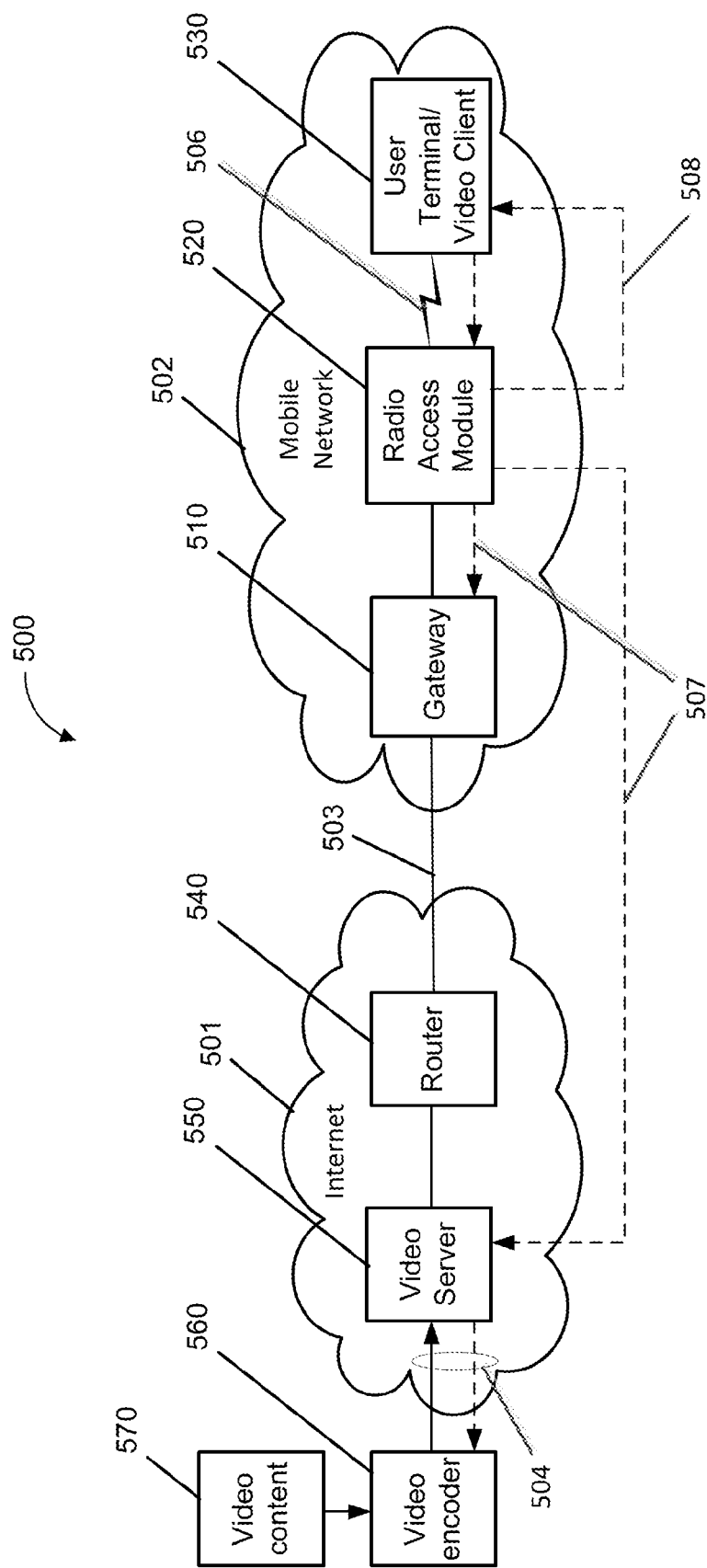
FIG. 5 is a block diagram illustrating a wireless communication system according to an exemplary embodiment.

FIG. 5 is a block diagram of a communication system 500 that embodies a system for congestion triggered scaling of downlink video such as that illustrated in FIG. 4A. Video content 570 can be video data that is provided to a video encoder 560. Video encoder 560 encodes the video for use by a video client, such as video client 440 in FIGS. 4A and 4B. Video encoder 560 may encode the video content while it is being streamed, or the video content may be encoded ahead of time for storage and later playback. Video encoder 560 may encode the video in multiple different formats, may switch between formats on command, or may generate multiple copies of the video encoded at different rates for storage and later playback, for example, at a selected rate. Video server 550 is responsible for providing video clients with access to the encoded video. In some embodiments one or more routers 540 or other devices comprising the Internet may facilitate transport of the video between the video server 550 and a video client 440.

In an illustrated embodiment, such as that in FIG. 5, the video client 440 of FIG. 4A and FIG. 4B, can be associated with user terminal/video client 530. It should be noted that such an association is illustrative only and does not limit or exclude other relationships between video client 440 and a user device, such as when a user device is a wireless dongle and the video client resides on a laptop communicatively coupled to an access node 300 via the wireless dongle. Video passes from the Internet to the mobile network via one or more gateways which transfer data to Radio Access Module 520 which can be associated with an instance of, for example, an access node 300 in FIG. 3. In an embodiment, Radio access module 520 can be, for instance, an LTE eNodeB or a WiMAX base station. In an embodiment gateway 510 can be an LTE packet gateway (P-GW), serving gateway (S-GW) or a combination of both, or the like. Radio Access Module 520 can include comm channel control module 410 and controls the transmission of data to and from user terminal/video client 530 via a channel such as, for example, capacity constrained channel 409.

As described hereinabove with respect to the various modules of FIG. 4A and FIG. 4B, radio access module 520 monitors congestion on channel 506. Radio Access Module 520 may alternatively or in addition monitor the congestion situation of individual user terminals 530, even when the composite channel 506 is not congested. Radio access module 520 may detect that video transmissions to user terminal/video client 530 may be of a type that embodies a reactive video client that will monitor its own packet reception and decoder queue depths and will ask the video source for a different video rate when the video client deems that the requested rate will better preserve the video quality. It should further be noted that Radio access module 520 may intentionally increase or decrease the rate of transmission to user terminal/video client 530 in order to trigger the video client to request a different video rate from a video scaling module 430 somewhere in the network. Alternatively, radio access module 520 may communicate with an application on the user terminal/video client 530 that can be coupled with the video client, triggering the video client to request a video rate change in order to mitigate congestion or take advantage of unused capacity.

In accordance with various exemplary and alternative exemplary embodiments, the video scaling module 430 of FIG. 4A may reside in numerous places within the network, for example, in the radio access module 520, gateway 510, router 540, video server 550, or video encoder 560 shown in FIG. 5. For instance, video scaling module 430 can be associated with the video encoder 560 because the video encoder may have the capability to decode at different resolutions or bit rates. Alternatively, the video scaling module 430 may be located in the video server 550 because the video server may have the ability to store versions of the video encoded at different resolutions or bit rates, or gateway 510 because the gateway may contain or be collocated with or contain a transcoder. It will be understood by one skilled in the art that the video scaling module 430 can reside any place between the video content 570 and channel 506. In an embodiment, video scaling module 430 can reside within radio access module 520. As can be seen in FIG. 5, control path 507 may have different endpoints and traverse more or fewer network nodes depending on the separation between video scaling module 430 and capacity constrained link 506 or 409.

Figure 6A:
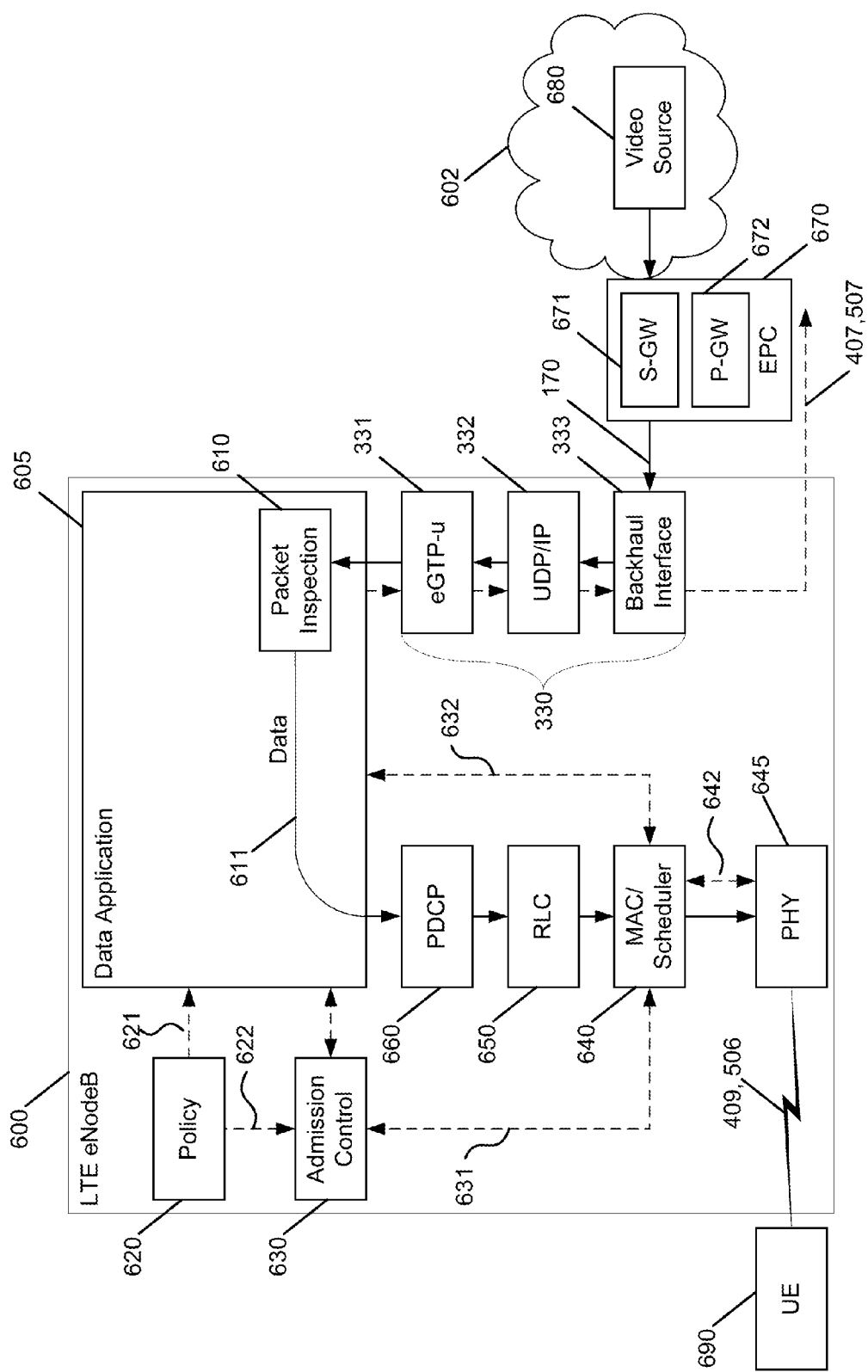
FIG. 6A is a block diagram illustrating an access node associated with detection of video and congestion according to an exemplary embodiment.

FIG. 6A shows an LTE eNodeB 600 configured for detection of video and congestion according to an embodiment of radio access node 520, access node 300, or the like. It should be noted that the solid arrows in FIG. 6A depict the data path for downlink data, such as data including video from sources located within a larger network to the user equipment (UE) 690. It should be understood that there may also be control messages on the downlink and that a corresponding uplink path would typically be present. At least the control messages on the uplink, and other components of a link, or the like, for illustrative purposes are shown as control path 407, 507. Control paths 407, 507, and other control paths are depicted as dashed lines. It should further be understood that other control paths may be present, which for convenience, are not shown in the diagram.

Video source 680 can be a source of video somewhere in network 602. Video source 680 may be a video source that is independent of the LTE operator network such as, for example, Netflix or YouTube. Alternatively, video source 680 may be an operator controlled video content delivery network (CDN) providing, for example, video on demand (VOD) or other video services. One skilled in the art would understand that the video source 680 could reside in a variety of locations within a larger network, such as network 602 and that there may be many video sources that serve video data to multiple UEs simultaneously.

In an LTE network, all data, including video data, destined for a UE passes through an evolved packet core (EPC) 670 having a packet gateway (P-GW) 672 and serving gateway (S-GW) 671 in the data path, amongst other functions. It will be appreciated that in some embodiments, the functionality of the P-GW and S-GW gateways may be combined into a single device. EPC 670 can provide data to the LTE eNodeB 600 through backhaul 170. The LTE eNodeB 600 receives the data through backhaul 170 and backhaul interface module 330, which can include a backhaul interface 333, a UDP/IP module 332, and an eGTP-u module 331. It will be appreciated that, in an exemplary embodiment Backhaul interface module 330 may include a physical interface such as gigabit Ethernet interface and protocol stack layers that facilitate the transfer of packets with the EPC 670.

Downlink data can be received by packet inspection module 610, which detects the presence of video in the downlink data as described in further detail below, for example, with respect to FIG. 7. In the present embodiment, packet inspection module 610 is illustrated as part of the data application module 605. However, one of skill in the art will recognize that other arrangements are possible. Further, data application module 605 may also be configured to contain other functions such as a function that maps tunnels to data radio bearers (DRB), creating the logical data channels, logical data links, logical data paths, or the like, from the core network to the UE, which allows the LTE eNodeB to determine the destination UE for a packet of data.

Data can be forwarded to a protocol stack such as, for example, the multi-layer LTE air interface stack for transmission. It will be understood that while the LTE air interface stack typically consists of multiple layers, the number of layers and the exact allocation of functionality within the layers can be subject to broad flexibility without departing from the scope of the invention. The Packet Data Convergence Protocol (PDCP) layer 660 is generally responsible for encryption, header compression, and queuing of packets. The Radio Link Control (RLC) layer 650 is generally responsible for segmentation and reassembly. In some embodiments RLC also de-queues packets or fragments for transmission over the air. The Media Access Control (MAC)/scheduler layer 640 can, inter alia, determine which DRBs will receive air interface resources and also determines which resources to use. MAC/scheduler layer 640 can pass data from the chosen DRBs from the RLC layer 650 to the Physical layer (PHY) 645 which may be embodied, for instance, in a receiver/transmitter module 310 as shown in FIG. 3. The PHY layer 645 transmits the downlink data across a channel 409 to UE 690.

In an embodiment, MAC/Scheduler layer 640 receives information from the PHY layer 645 regarding the signal quality of the transmissions from each UE 690 to the eNodeB 600, for example RSSI, SNR, CINR, hybrid automatic retry request (HARM) retransmissions, BER, packet error rate (PER), or the like. The MAC/Scheduler layer 640 also receives information derived from reports transmitted by the UEs 690 regarding the signal quality of the transmissions from the LTE eNodeB 600 to each UE 690. The MAC/Scheduler layer 640 uses the signal quality related information to determine the PHY transmission mode of each UE 690, which mode determines the quantity of resources of channel 409 that are necessary to transmit data to each UE 690. The MAC/Scheduler layer 640 may also be configured to know the buffer occupancy, that is, the quantity of data presently queued, for each DRB or UE 690. It will be appreciated that at least one or a combination of the PHY transmission modes of the UEs, bandwidth guarantees, buffer occupancy, and the like, can be used to determine whether congestion is present. Alternatively, or in addition, the packet discard level or rate due to buffer or queue overflow, the queue latency - the length of time a packet spends in a queue or in a queued condition prior to transmission, or other metrics may also be used to determine congestion. MAC/Scheduler layer 640 indicates congestion to the data application layer 605. Alternatively, or in addition, the MAC/Scheduler layer 640 indicates congestion to an Admission Control Module (ACM) 630. In an embodiment, the MAC/Scheduler layer 640 can include all or a portion of the Congestion Monitoring and Control Module 415 of FIG. 4A. It should be understood that while the above functions are described with respect to the MAC/Scheduler Layer 640, they could be performed in, in connection with, or in cooperation with other layers or modules such as PDCP 660 or RLC 650.

Based on congestion information, information about bandwidth guarantees, other information, and the like, the ACM 630 can determine when a new DRB may be allowed. It may also determine what actions to take when congestion is detected. For instance, ACM 630 may suspend or deactivate a DRB, may determine that a particular DRB must reduce its resource consumption, or the like. ACM 630 may consider input from a policy module 620 when making its determinations. ACM 630 may also receive and consider input from data application module 605, such as information from packet inspection module 610 regarding video transported on certain DRBs.

In an embodiment, Feedback Conversion Module 420 is part of Data Application Module 605. Based on congestion information received from MAC/Scheduler layer 640, congestion information received from ACM 630, or both, Data Application Module 605 or other logic in LTE eNodeB 600 takes actions necessary to cause video data destined for a UE 690 to be scaled, for instance differently encoded, using fewer or more resources. As described with respect to FIG. 4A, control of the video encoding may be via request or commands to scale the video to a different rate transmitted on control path 407,507 to the Video Source 680 or a transcoder, which is an embodiment of Video Scaling Module 430, in an intermediate piece of network equipment. Alternate methods described with respect to FIG. 4A may also be used. In an alternate embodiment, Feedback Conversion Module 420 is part of ACM 630 which implements the described methods, causing video to be scaled to a different rate.

One skilled in the art would understand that LTE eNodeB may also contain other functionality not described here such as functionality supporting mobility, self-organizing networks, etc. Even though the invention was described using an LTE eNodeB as an example, one skilled in the art would understand that the invention could also be embodied in a different type of access node such as a WiMAX base station, 3G base transceiver station or cable modem head end.

It should be noted that the above described functionality may also be applied in association with uplink video detection and scaling as was described with respect to FIG. 4B.

Figure 6B:
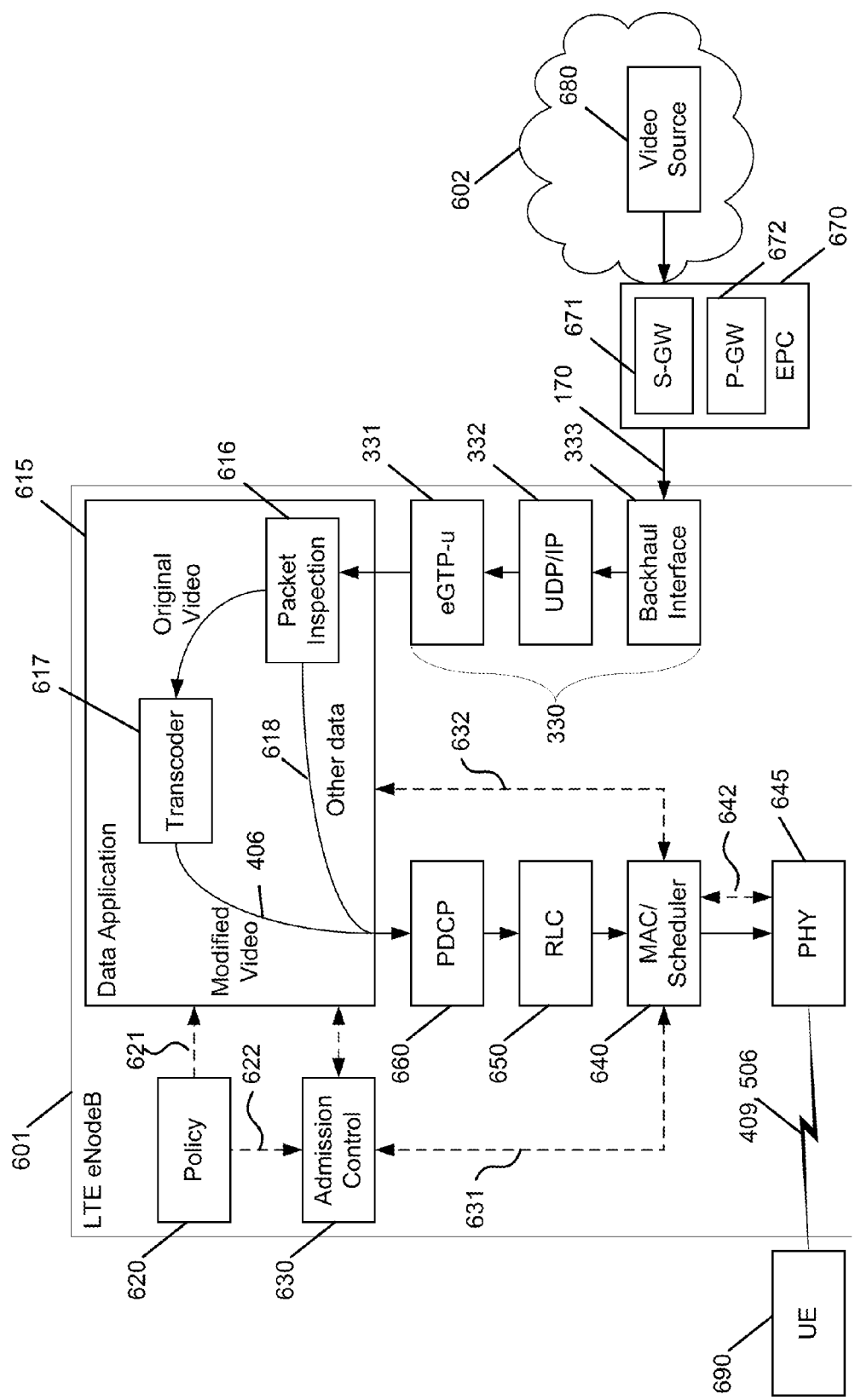
FIG. 6B is a block diagram illustrating an access node for detection of video and congestion and for performing video scaling according to an exemplary embodiment.

In accordance with exemplary and alternative exemplary embodiments, FIG. 6B shows an LTE eNodeB access node 601. The LTE eNodeB access node 601 contains a Data Application Module 615. Data Application Module 615 comprises a Packet Inspection Module 616 and a Transcoder 617. Transcoder 617 can be an embodiment of Video Scaling Module 430 in FIG. 4A. In the present embodiment, Packet Inspection Module 616 passes video to be scaled to Transcoder 617. Other data, including video that does not need to be scaled bypasses Transcoder 617 and is sent to the LTE protocol stack for further processing such as for encryption or header compression, queuing, scheduling, and transmission. Transcoder 617 scales video before passing it to the LTE protocol stack. In the present embodiment, data path 406 of FIG. 4A is completely contained in the LTE eNodeB 601 as the path from Transcoder 617 to the LTE protocol stack such as PDCP layer 660 through PHY layer 645.

The methods described with respect to FIG. 6A and FIG. 6B are not mutually exclusive and may be implemented in the same access node.

Figure 7A:
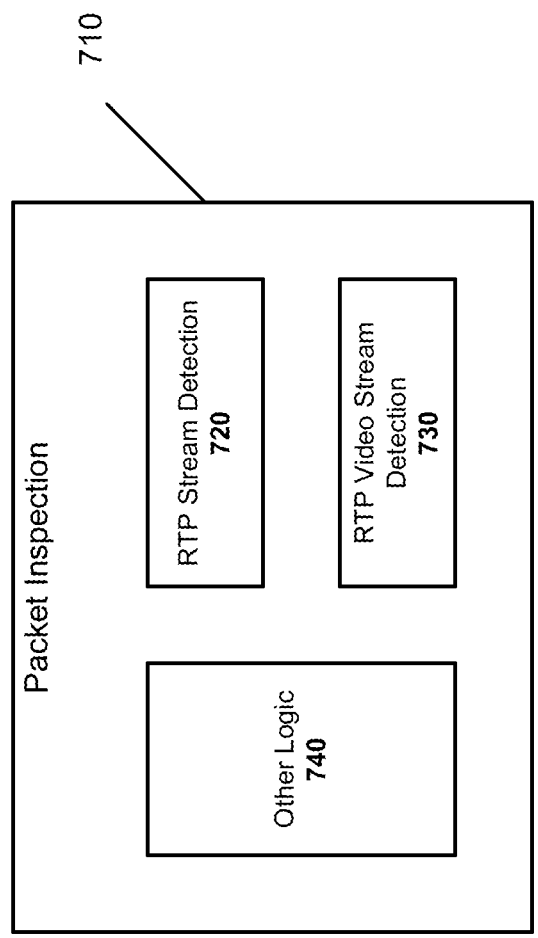
FIG. 7A is a functional block diagram illustrating a packet inspection module according to an exemplary embodiment.

FIG. 7A illustrates aspects of exemplary embodiments of the Packet Inspection module 610 or 616 which is shown as Packet Inspection module 710. In accordance with the illustrated embodiment or embodiments, Packet Inspection module 710 can include a Real-Time Protocol (RTP) Stream Detection module 720 and an RTP Video Stream Detection module 730 that is configured to detect, for example, whether either User Datagram Protocol (UDP) or Transmission Control Protocol (TCP) packets contain video data transported using RTP protocol. It should further be noted that in accordance with the Packet Inspection module 710 other functions may be implemented that can be illustrated by an Other Logic module 740. In an embodiment, the Packet Inspection module 710 can receive input traffic flowing in two directions and can classify the packets flowing in one direction using information from the packets flowing in the other direction. The Packet Inspection module 710 may receive information about the traffic flowing in the other direction from a second packet inspection module rather receiving the traffic itself.

RTP Stream Detection module 720 parses the first several bytes of UDP or TCP payload according to the format of an RTP packet header and checks the values of the RTP header fields to determine whether the stream flowing between two endpoints is an RTP stream. The RTP header format does not depend on the media type carried in the RTP payload, while the RTP payload format is media type specific. If the payload of a UDP or TCP packet contains an RTP packet, the values of several fields in the RTP header will have a special pattern. RTP Stream Detection module 720 may use one of these patterns or a combination of these patterns in determining whether a stream is an RTP stream. Determination of whether the stream is an RTP stream is described in detail in co-pending applications Ser. No. 13/236,308, titled "Systems and Methods for Prioritizing and Scheduling Packets in a Communications Network," and 1Ser. No. 3/549,106, titled "Systems and Methods for Prioritizing and Scheduling Packets in a Communications Network," which are incorporated by reference.

If a stream is detected to be an RTP stream, Video Stream Detection module 730 will perform further inspection on the RTP packet header fields and the RTP payload to detect whether the RTP stream carries video and which video codec generates the video stream.

The payload type of some RTP payloads related to video is defined in RFC 3551 (H. Schulzrinne, et al., IETF RFC 3551, "RTP Profile for Audio and Video Conferences with Minimal Control"). However, for a video codec with dynamically assigned payload type, the codec parameters are included in a Session Description Protocol (SDP) message. However, that SDP message may not be available to the Video Stream Detection Module 740.

If the RTP Video Stream Detection module 730 detects that payload type is dynamically assigned, it collects statistics regarding the stream. For example, statistics of values of the RTP header field "timestamp", RTP packet size, and RTP packet data rate may be collected. The RTP Video Stream Detection module 730 may then use one of the collected statistics or a combination of the statistics to determine whether the RTP stream carries video data.

A video stream usually has some well-defined frame rate, such as 24 FPS (frame per second), 25 FPS, 29.97 FPS, 30 FPS, or 60 FPS, or the like. In accordance with an embodiment, the RTP Video Stream Detection module 730 detects whether an RTP stream carries video data at least partially based on whether values of the RTP packet timestamp change in integral multiples of a common frame temporal distance, which is the inverse of a common frame rate.

It will also be appreciated that a video stream usually has higher average data rate and larger fluctuation in the instantaneous data rate as compared with an audio stream. In another embodiment, RTP Video Stream Detection module 730 detects whether an RTP stream carries video data at least partially based on the magnitude of the average RTP data rate and the fluctuation in the instantaneous RTP data rate.

The RTP payload format is media specific. For example, H.264 payload in an RTP packet always starts with a NAL unit header whose structure is defined in RFC 6814 (Y. K. Wang, et al., IETF RFC 6184, "RTP Payload Format for H.264 Video"). In an embodiment, Video Stream Detection module 730 detects which video codec generates the video data carried in an RTP stream at least partially based on the pattern of the first several bytes the RTP payload.

Once it is determined, using, for example, some of the arrangements as described hereinabove, that the packets flowing between two end points contain video data, the classification result can be used. The information regarding classification can also be stored such that upcoming packets can be classified using the information associated with the newly detected session.

Although FIG. 6B shows the video scaling operation for the downlink direction, those of skill in the art will appreciate that the arrangements, techniques, procedures and the like, as described herein, can also be implemented for the uplink direction.

Figure 7B:
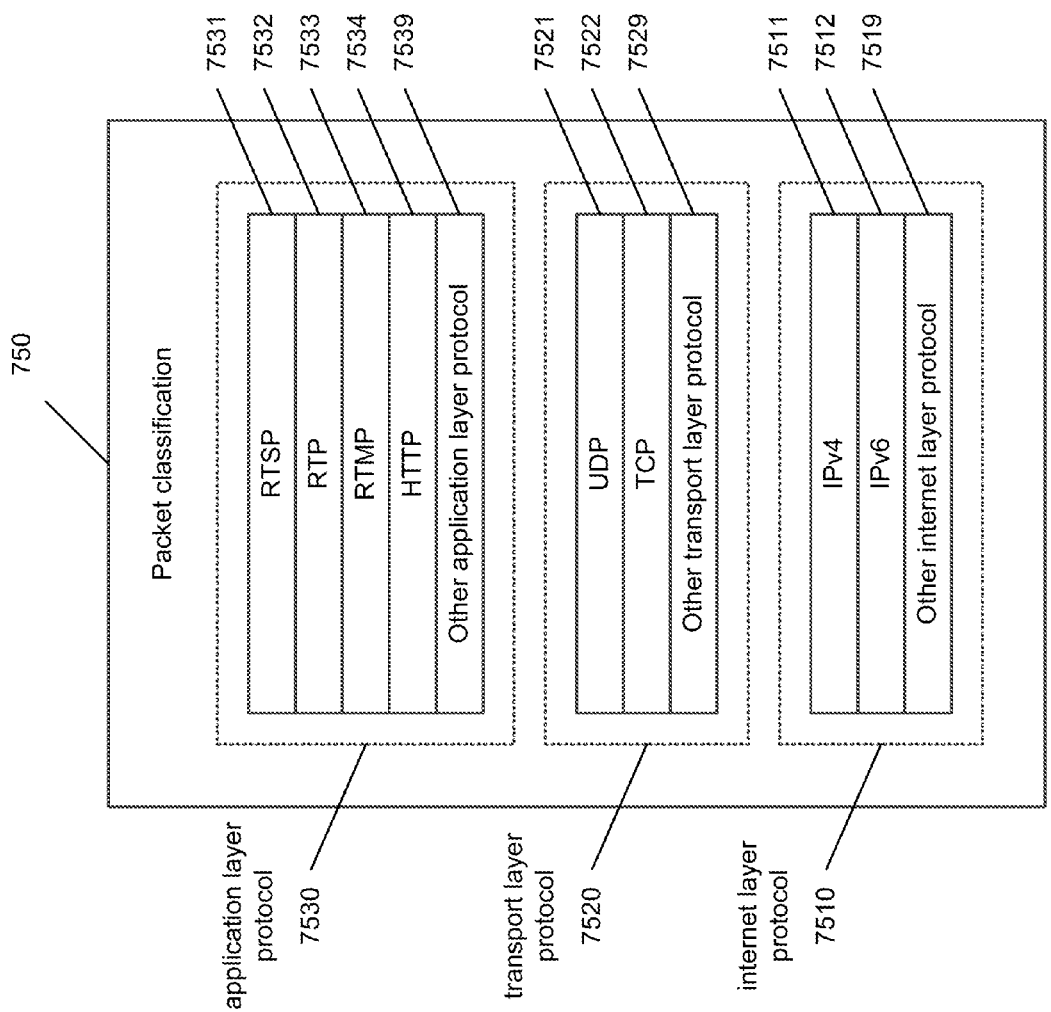
FIG. 7B is a block diagram illustrating a packet classifier associated with a packet inspection module according to an exemplary embodiment.

FIG. 7B illustrates aspects of an exemplary packet classification module 750 which may be included in a packet inspection module, such as the packet inspection module 610 of FIG. 6A or packet inspection module 616 of FIG. 6B, which may include the functionality of RTP Stream Detection module 710, for instance in RTP module 7532. The packet classification module 750 can classify a packet by analyzing the information in the packet header of an IP packet according to a specific internet layer protocol 7510, and header of the protocol data unit of a transport layer protocol 7520, and the message of the application layer protocol 7530, which is the payload of the protocol data unit (PDU) of the transport layer protocol. The internet layer protocol 7510 includes but is not limited to one or more of IPv4 7511 or IPv6 7512, or an other internet layer protocol 7519. The transport layer protocol 7520 includes but is not limited to UDP 7521 or TCP 7522 or an other layer protocol 7529. The application layer protocol includes but is not limited to one or more of RTSP 7531, RTP 7532, RTMP 7533, HTTP 7534, or an other application layer protocol 7539.

Figure 7C:
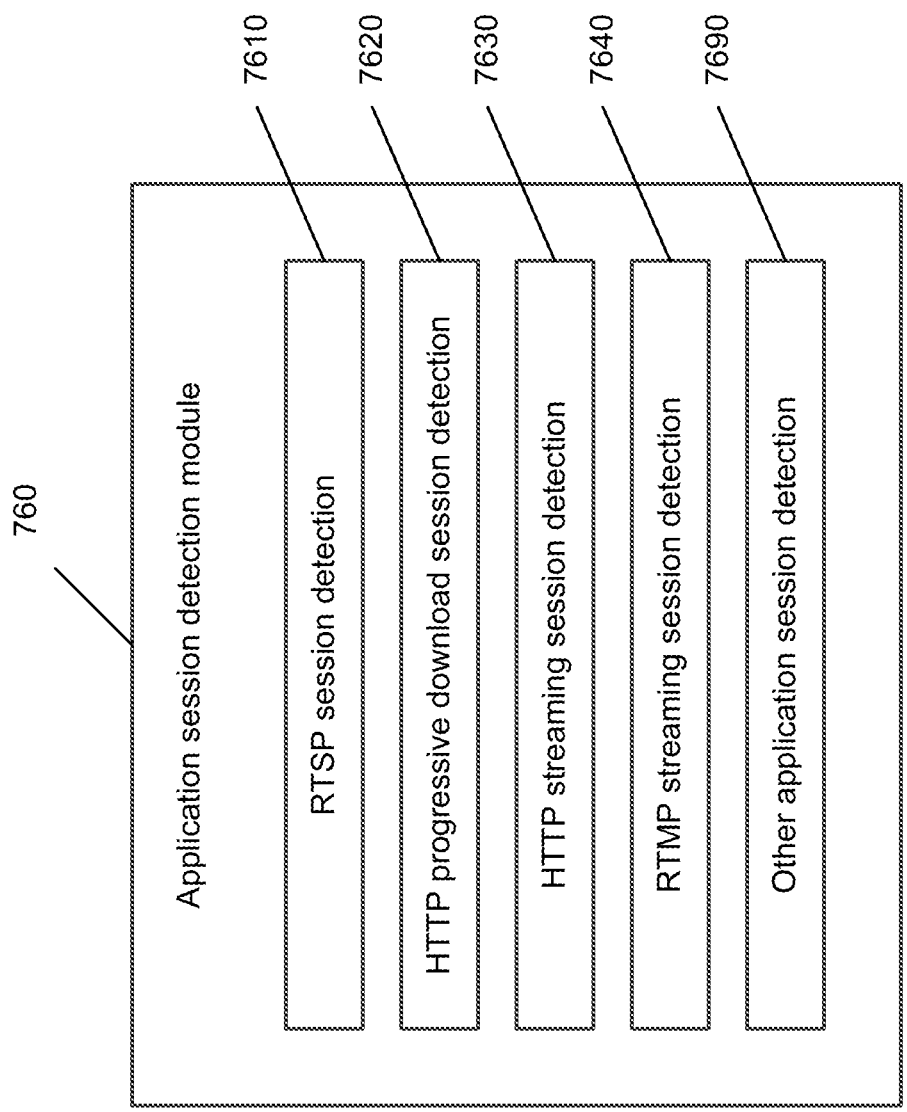
FIG. 7C is a block diagram illustrating of an application session detection module inside a packet inspection module according to an exemplary embodiment.

FIG. 7C illustrates an application session detection module 760, which may be part of a packet inspection module such as the packet inspection module 610 or 616 shown in FIG. 6A or 6B according to an embodiment and may include the functionality of RTP Video Stream Detection module 730. The application session detection module 760 may include one or more of RTSP session detection module 7610, HTTP progressive download session detection module 7620, HTTP streaming session detection module 7630, RTMP streaming session detection module 7640, and other application session detection modules 7690 for detecting sessions of other applications. Each session detection module also maintains a set of sessions of a specific application that are currently active in the network.

One skilled in the art would understand that in accordance with other embodiments, Packet Inspection module 710 may include other modules that inspect other packet attributes to detect video streams as described in greater detail herein below.

According to an embodiment, the Packet Inspection module 710 illustrated in FIG. 7A, can inspect the Internet Protocol (IP) source and destination addresses in order to determine the Application Class attribute, such as video, and the Specific Application attribute, such as Netflix, YouTube, and the like, of the data stream. With the IP source and destination addresses, the Packet Inspection module 710 can perform a reverse domain name system (DNS) lookup or an Internet "WHOIS" query to establish the domain name and/or registered assignees that source or receive the Internet-based traffic. The domain name and/or registered assignee information can then be used to establish both Application Class and Specific Application attributes for the data stream based upon a priori knowledge of the domain or assignee purpose. The Application Class and Specific Class information, once derived, can be stored for reuse. For example, if more than one user device accesses Netflix, the Packet Inspection module 710 can be configured to cache the information so that Packet Inspection module 6710 would not need to determine the Application Class and Specific Application for subsequent accesses to Netflix by the same user device or another user device on the network.

For example, if a traffic stream associated with a particular IP address yields a reverse DNS lookup or WHOIS query which included the name 'YouTube,' then this traffic stream could be considered a unidirectional stream of the Application Class "video" using the Specific Application "YouTube." According to an embodiment, a comprehensive mapping between domain names or assignees and Application Class and Specific Application can be maintained. In an embodiment, such an exemplary mapping can be periodically updated to ensure that the mapping remains up to date.

According to another embodiment, the Packet Inspection module 710 can be configured to inspect the headers, the payload fields, or both of data packets associated with various communications protocols and to map the values contained therein to a particular Application Class or Specific Application. For example, according to an embodiment, the Packet Inspection module 710 can be configured to inspect the Host field contained in an HTTP header. The Host field typically contains domain or assignee information which, as in accordance with the above described embodiments, can be used to map the stream to a particular Application Class or Specific Application. For example an HTTP header field of "v11.1scache4.c.youtube.com" detected by the Packet Inspection module 710 could be mapped to Application Class=video stream, Specific Application=YouTube.

According to another embodiment, the Packet Inspection module 710 can be configured to inspect the 'Content Type' field within a Hyper Text Transport Protocol (HTTP) packet. The Content Type field contains information regarding the type of payload, based upon the definitions specified in the Multipurpose Internet Mail Extensions (MIME) format as defined by the Internet Engineering Task Force (IETF). For example, the following MIME formats would indicate either a unicast or broadcast video packet stream: "video/mp4, video/quicktime, video/x-ms-wm." In an embodiment, the Packet Inspection module 710 can be configured to map an HTTP packet to the video stream Application Class if the Packet Inspection module 710 detects any of these MIME types within the HTTP packet.

In another embodiment, the Packet Inspection module 710 can be configured to inspect a protocol sent in advance of the data stream. For example, the Packet Inspection module 710 can be configured to identify the Application Class or Specific Type based on the protocol used to set up or establish a data stream instead of identifying this information using the protocol used to transport the data stream.

According to an embodiment, the protocol sent in advance of the data stream is used to identify information on Application Class, Specific Application and characteristics that allow the transport data stream to be identified once initiated.

For example, in an embodiment, the Packet Inspection module 710 can be configured to inspect Real Time Streaming Protocol (RTSP) packets which can be used to establish multimedia streaming sessions. RTSP packets are encapsulated within TCP/IP frames and carried across an IP network.

RTSP establishes and controls the multimedia streaming sessions with client and server exchanging the messages. A RTSP message sent from client to server is a request message. The first line of a request message is a request line. The request line is formed with the following 3 elements: (1) Method; (2) Request-URI; and (3) RTSP-Version. It will be appreciated that the above described elements are associated with protocol elements as would be understood by one of skill in the art. Accordingly, the term "method" for example refers to a given message and the like.

RTSP defines methods including OPTIONS, DESCRIBE, ANNOUNCE, SETUP, PLAY, PAUSE, TEARDOWN, GET_PARAMETER, SET_PARAMETER, REDIRECT, and RECORD. Below is an example of a message exchange between a client ("C") and a server ("S") using method DESCRIBE. The response message from the server has a message body which is separated from the response message header with one empty line.

```
C->S: DESCRIBE rtsp://s.companydomain.com:554/dir/f.3gp RTSP/1.0
CSeq: 312
    Accept: application/sdp
S->C: RTSP/1.0 200 OK
CSeq: 312
    Date: 23 Jan 1997 15:35:06 GMT
    Content-Type: application/sdp
    Content-Length: 376
    v=0
    o=- 2890844526 2890842807 IN IP4 126.16.64.4
    s=SDP Seminar
    c=IN IP4 224.2.17.12/127
    t=2873397496 2873404696
    m=audio 49170 RTP/AVP 0
    m=video 51372 RTP/AVP 31
```

Request-URI in an RTSP message is defined to always contain the absolute URI as defined in RFC 2396 (T. Berners-Lee, et al., IETF RFC 2396, "Uniform Resource Identifiers (URI): Generic Syntax"). An absolute URI in an RTSP message contains both the network path and the path of the resource on the server. Following is the absolute URI in the message listed above.

rtsp://s.companydomain.com:554/dir/f.3gp

RTSP-Version indicates which version of the RTSP specification is used in an RTSP message.

In an embodiment, the Packet Inspection module 710 can be configured to inspect the absolute URI in the RTSP request message and extract the network path. The network path typically contains domain or assignee information which, as described in the embodiment above, is used to map the stream to a particular Application Class or Specific Application. For example, an RTSP absolute URI "rtsp://v4.cache8.c.youtube.com/dir_path/video.3gp" could be inspected by the Classifier and mapped to Application Class=video stream, Specific Application=YouTube. In an embodiment, Packet Inspection module 710 inspects packets sent from a client to a server to classify related packets sent from the server to the client. For example, information from an RTSP request message sent from the client may be used in classifying responses from the server.

The RTSP protocol may specify the range of playback time for a video session by using the Range parameter signaled using the PLAY function. The request may include a bounded range of time including, for example, a stop time and a start time, or may include an open-end range of time that specifies a start time only. Time ranges may be indicated using either the normal play time (npt), society for motion picture television engineers (smpte) time or clock parameters. Npt time parameters may be expressed in either hours:minutes:seconds.fraction format or in absolute units per ISO 8601 format timestamps. Smpte time values are expressed in hours:minutes:seconds.fraction format. Clock time values are expressed in absolute units per ISO 8601 formatted timestamps. Table one illustrates examples of Range parameter usage are as follows:

TABLE 1

Range: npt=1:02:15.3-
Range: npt=1:02:15.3 - 1:07:15.3
Range: smpte=10:07:00-10:07:33:05.01
Range: clock=19961108T142300Z-19961108T143520Z In an embodiment, the Packet Inspection module 710 can be configured to inspect the RTSP messages and extract the Range information from a video stream using the npt, smpte or clock fields. One skilled in the art would understand that the npt, smpte and clock parameters within an RTSP packet may use alternate syntaxes in order to communicate the information described above. Alternatively, additional formats or parameters are possible.

The RTSP protocol includes a DESCRIBE function that is used to communicate the details of a multimedia session between Server and Client. This DESCRIBE request is based upon the Session Description Protocol (SDP), which is defined in RFC 4566 (supersedes RFC 2327) which specifies the content and format of the requested information. With SDP, the m-field defines the media type, network port, protocol and format. For example, consider the SDP media descriptions shown in Table 2:

TABLE 2

1) m=audio 49170 RTP/AVP 0
2) m=video 51372 RTP/AVP 31

In the first example in Table 2, an audio stream is described using the Real-time Transport Protocol (RTP) for data transport on Port 49170 and based on the format described in the RTP Audio Video Profile (AVP) number 0. In the second example in Table 2, a video stream is described using RTP for data transport on Port 51372 based on RTP Audio Video Profile (AVP) number 31.

In both RTSP examples of Table 2, the m-fields are sufficient to classify a data stream to a particular Application Class. Since the m-fields call out communication protocol (RTP) and IP port number, the ensuing data stream(s) can be identified and mapped to the classification information just derived. However, classification to a Specific Application is not possible with this information alone.

The SDP message returned from the server to the client may include additional fields that can be used to provide additional information on the Application Class or Specific Application.

An SDP message contains the payload type of video and audio stream transported in RTP. Some RTP video payload types are defined in RFC 3551. For example, payload type of an MPEG-1 or MPEG-2 elementary video stream is 32, and payload type of an H.263 video stream is 34. However, payload type of some video codecs, such as H.264, is dynamically assigned, and an SDP message includes parameters of the video codec. In an embodiment, the video codec information may be used in classifying video data streams, and treating video streams differently based on video codec characteristics.

An SDP message may also contain attribute "a=framerate: <frame rate>", which is defined in RFC 4566, that indicates the frame rate of the video. An SDP message may also include attribute "a=framesize:<payload type number><width><height>", which is defined in 3GPP PSS (3GPP TS 26.234, "Transparent End-to-End Packet-switched Streaming Service, Protocols and Codecs"), may be included in SDP message to indicate the frame size of the video.

For historical reasons, some applications may use non-standard attributes such as "a=x-framerate: <frame rate>" or "a=x-dimensions: <width><height>" to pass similar information as that in "a=framerate:<frame rate>" and "a=framesize xpayload type number><width><height>". In an embodiment, the Packet Inspection module 710 can be configured to inspect the SDP message and extract either the frame rate or the frame size or both of the video if the corresponding fields are present, and use the frame rate or the frame size or both in providing additional information in mapping the stream to a particular Application Class or Specific Applications.

In an embodiment, the Packet Inspection module 710 inspects network packets directly to detect whether these packets flowing between two endpoints contain video data carried using RTP protocol (H. Schulzrinne, et al., IETF RFC 3550, "RTP: A Transport Protocol for Real-Time Applications"), and Packet Inspection module 710 performs inspection without inspecting the SDP message or any other message that contains the information describing the RTP stream, for example, when either the SDP message or any other message containing similar information does not pass through Packet Inspection module 710, or in an embodiment whereby Packet Inspection module 710 chooses not to inspect such message. An RTP stream is a stream of packets flowing between two endpoints and carrying data using RTP protocol, while an endpoint is defined by an[IP address, port number] pair.

Figure 8:
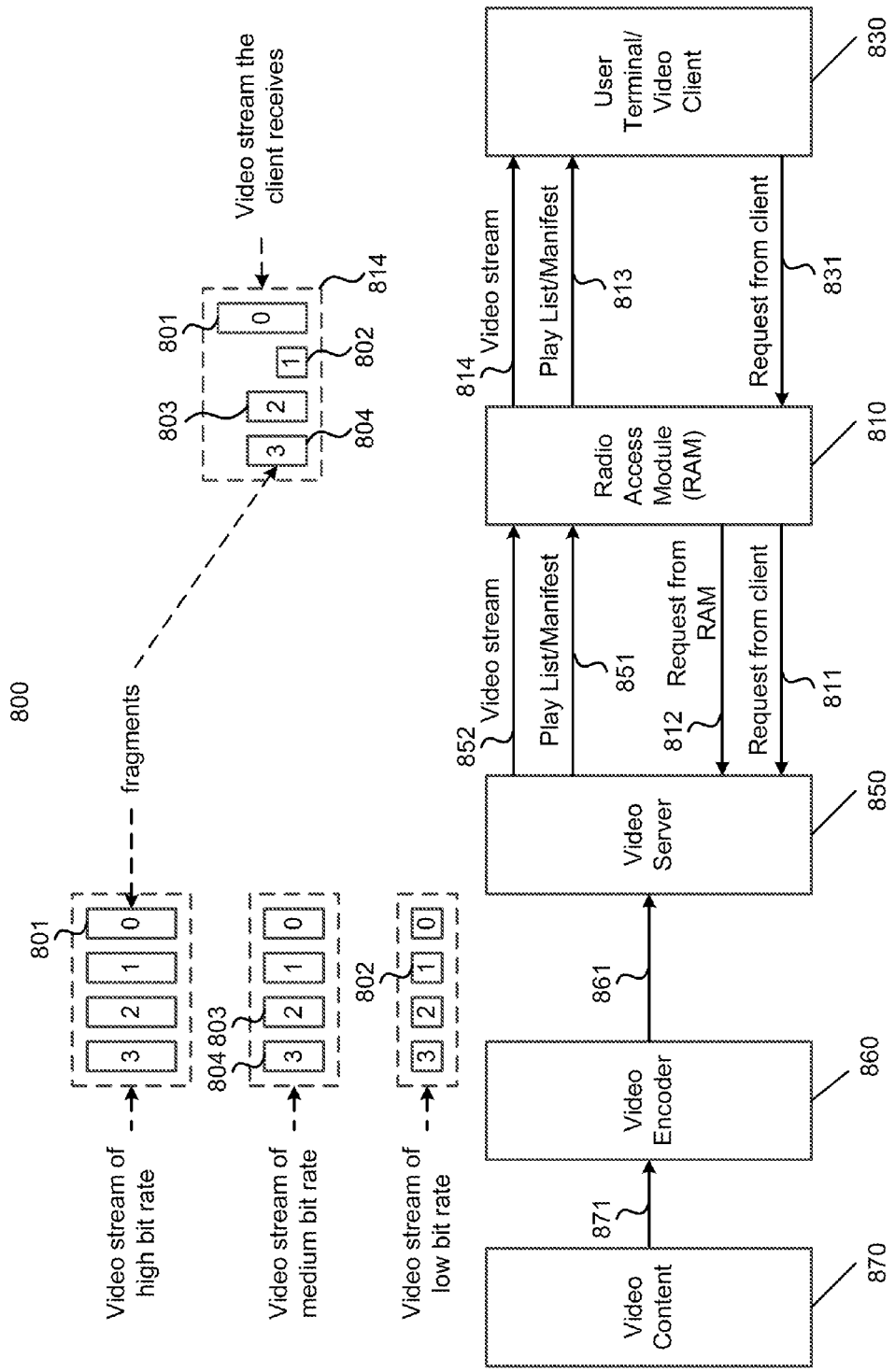
FIG. 8 is a block diagram illustrating a wireless communication system that supports video streaming of adaptive bit rate change according to an exemplary embodiment.

FIG. 8 shows a wireless communication system 800 that supports congestion induced video scaling using adaptive bit rate change according to an embodiment of the wireless communication system 500. Although not shown in FIG. 8, one or more routers or gateways can be positioned between the video server 850 and radio access module 810, as in the wireless communication system 500 in FIG. 5.

In the wireless communication system, 800 the video server 850 can provide a video stream 852 having different bit rates. Video server 850 can fetch a video stream 852 in any of three different bit rates: high, medium, and low. In some embodiments, the number of bit streams and the bit rate of each bit stream are determined before video streaming is started. In another embodiment, the number of bit streams and bit rate of each bit stream may be determined dynamically during video streaming session. Different arrangements and techniques for changing the video stream bit rate are possible. In an embodiment, the video encoder generates multiple bit streams of different bit rates before video streaming to generate a combined rate video stream. In another embodiment, the video encoder can change the encoding parameters dynamically to generates video bit stream of a single, but varying bit rate.

It will be appreciated that HTTP streaming, such as Microsoft HTTP smooth streaming, Apple HTTP Live Streaming, Adobe HTTP Dynamic Streaming, and MPEG/3GPP Dynamic Adaptive Streaming over HTTP (DASH), is one type of application that supports video streaming of varying bit rate. In HTTP streaming, each video bit stream is generated as a collection of independently decodable movie fragments by the encoder. The video fragments belonging to bit streams of different bit rates are aligned in playback time. The information about bit streams, such as the average bit rate of each bit stream and the play time duration of each fragment, is sent to the client at the beginning of a session in one or more files which are commonly referred to as play list files or manifest files 813. In HTTP streaming of a live event, the play list files or manifest files 813 may be applicable to certain periods of the presentation, and the client needs to fetch new play list files or manifest files 813 to get updated information about the bit streams and fragments in bit streams.

Since the client has the information about bit streams and fragments that will be played, the fragments from bit streams of different bit rates will be fetched based on the current estimation by the client of channel conditions or based on control information from, for instance, Comm Channel Control Module 410 of FIG. 4A. In the example shown in FIG. 8, the client requests the first fragment 801 from the bit stream of high bit rate, the second fragment 802 from the bit stream of low bit rate, and the last 2 fragments 803 and 804 from the bit stream of medium bit rate.

In an embodiment, the comm channel control module 410 of FIG. 4A can reside in a radio access module, such as Radio Access Module 810. The packet inspection module 710 of FIG. 7A or 610 of FIG. 6A, or a component such as Application session detection module 760 of FIG. 7C, can detect the presence of the HTTP streaming session, and can keep copies of the play list and manifest files 851. To further direct the scaling of video, in an embodiment, Radio Access Module 810 or a component thereof such as Comm Channel Control Module 410 of FIG. 4A may modify the play list and manifest files 851 to remove information regarding video bit streams incompatible with current congestion conditions, before forwarding the modified play list and manifest files 813 to User Terminal/Video Client 830. The terms "play list" and "manifest file," for simplicity, will be referred to herein generally as a support file. One of ordinary skill in the art will recognize that as terms used to describe these files can change the general meaning and function of these files remains the same and would fall within the scope of the invention. Comm channel control module 410 estimates the channel condition, which may include but is not limited to, the bandwidth currently available to a particular client, or the like. In an embodiment, the Radio Access Module 810 sends the channel estimation result to the client 830 and the client makes the decision on what fragments to request in the future at least in part based on the channel estimation result sent by the Radio Access Module 810. In another embodiment, the Radio Access Module 810 may change its scheduling to provide either more bandwidth or less bandwidth, affecting the channel bandwidth estimation performed by the client 830 inducing the client to request fragments from a bit stream of a higher or lower bit rate in order to improve the channel utilization. For example, if the radio access module 810 detects or anticipates the congestion on the air link, it may significantly reduce the bandwidth allocation for a client 830 to induce the client to make the bit rate switch happen earlier.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, units, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a unit, module, block or step is for ease of description. Specific functions or steps can be moved from one unit, module or block without departing from the invention.

The various illustrative logical blocks, units, steps and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module (or unit) executed by a processor, or in a combination of the two. A software module can reside in RAM memory, flash memory, ROM memory, EPROM memory, EEPROM memory, registers, hard disk, a removable disk, a CD-ROM, or any other form of machine or computer readable storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

What is claimed is:

1. A method for managing congestion in a communications channel in a communication network, the communication channel carrying a plurality of data streams, each of the data streams including data packets, the method comprising:
   determining that one or more of the plurality of data streams includes video data;
   determining an overall demand associated with the plurality of data streams, the overall demand capable of varying over time;
   determining a capacity of the communication channel, the capacity capable of varying over time;
   determining a congestion level of the communication channel, the congestion level based at least in part on the capacity of the communication channel and the overall demand associated with the plurality of data streams, the congestion level varying with the capacity and the overall demand;
   detecting a change in the determined congestion level; and
   adjusting, if a change is detected in the congestion level and one or more of the data streams is determined to include video data and the determined congestion level is above a predetermined congestion level, the bit rate of the video data in the one or more of the plurality of data streams so that the data packets of the plurality of data streams can be transferred over the communication channel in accordance with the capacity,
   wherein the determining the congestion level further includes determining that the overall demand associated with the plurality of data streams exceeds the capacity of the communication channel.

2. The method according to claim 1, wherein:
   if the congestion level is determined to be above the predetermined congestion level, the bit rate is adjusted downward in accordance with the capacity; and
   if the congestion level is determined to be below the predetermined congestion level, the bit rate is adjusted upward in accordance with the capacity.

3. The method according to claim 1, wherein the determining that one or more of the plurality of data streams includes video data further comprises inspecting an attribute of the data packets of at least one data stream to determine if the data stream includes video data.

4. The method according to claim 1, wherein the determining that one or more of the plurality of data streams includes video data further comprises determining that the data packets of a data stream include real time protocol (RTP) packets and, based on the contents of header information associated with the RTP packets, determining that the data stream includes video data.

5. The method according to claim 1, wherein the determining that one or more of the plurality of data streams includes video data further comprises determining that a payload type associated with one or more of the data packets of a data stream is dynamically assigned to determine that the data stream includes video data.

6. The method according to claim 1, wherein the determining that one or more of the plurality of the data streams includes video data further comprises storing statistics associated with one or more of the data packets of a data stream if the header of the one or more data packets is dynamically assigned.

7. The method according to claim 1, wherein the data packets are transferred over an uplink associated with the communication channel.

8. The method according to claim 1, wherein the data packets are transferred over a downlink associated with the communication channel.

9. The method according to claim 1, wherein the determining the overall demand associated with the plurality of data streams further includes detecting that a new video session is being requested.

10. The method according to claim 1, wherein the detecting a change in the congestion level further includes determining a change in a physical layer (PHY) operating mode associated with one or more devices in the communication network.

11. The method according to claim 10, wherein the detecting a change in the congestion level further includes recalculating a capacity of the communication channel when the change in the PHY operating mode is detected and determining that the overall demand associated with the plurality of data streams exceeds the capacity of the communication channel.

12. The method according to claim 10, wherein the determining a change in a physical layer (PHY) operating mode includes determining a statistic associated with a physical layer (PHY) mode, wherein the statistic includes one or more of a signal to noise ratio (SNR) associated with the communication channel, a received signal strength indicator (RSSI), a carrier to interference plus noise ratio (CINR), a bit error rate (BER), and a retransmission count.

13. The method according to claim 1, wherein:
   the detecting a change in the congestion level further includes predicting a congestion level, and if the predicted congestion level is at or above the predetermined congestion level, adjusting the bit rate of the video data of at least one of the plurality of data streams so that the data packets can be transferred over the communication channel in accordance with a predicted capacity based on the predicted congestion level.

14. The method according to claim 1, wherein the detecting a change in the congestion level further includes determining a condition of a buffer associated with the transfer of the data packets over the communication channel.

15. An access node that manages congestion in a communication channel of a communication network, the communication channel carrying a data stream that includes data packets, the access node comprising:
   a packet inspection unit configured to inspect one or more of the data packets to determine if the data stream includes video data;
   a congestion unit coupled to the packet inspection unit, the congestion unit configured to determine a congestion level in the communication channel of the communication network, the congestion level associated with a capacity of the communication channel, the congestion level capable of varying over time, and the congestion level of the communication channel capable of varying with the capacity of the communication channel; and
   a feedback conversion unit coupled to the packet inspection unit and the congestion unit, the feedback conversion unit configured to trigger an adjustment of a bit rate of the data stream responsive to the congestion unit, wherein the feedback conversion unit triggers the adjustment of the bit rate of the data stream if the data stream is determined to include video data and the congestion level is determined to be above a predetermined congestion level, the triggered adjustment of the bit rate of the data stream being sufficient to allow for transfer of the data packets over the communication channel in accordance with the capacity.

16. The access node according to claim 15, wherein the feedback conversion unit is further configured to trigger the adjustment of the bit rate of the data stream by sending a request to a video scaling unit.

17. The access node according to claim 15, wherein the feedback conversion unit is further configured to trigger the adjustment of the bit rate of the data stream by sending a request to a video client.

18. The access node according to claim 15, wherein the packet inspection unit is further configured to determine that a video client associated with video data is a reactive video client.

19. The access node according to claim 18, wherein the feedback conversion unit is further configured to trigger the adjustment of the bit rate of the data stream by adjusting the bandwidth available to the reactive video client.

20. The access node according to claim 15, wherein the access node comprises one of: a mobile WiMAX base station; a GSM wireless base transceiver station (BTS); a Universal Mobile Telecommunications System (UMTS) NodeB; an LTE evolved Node B; and a cable modem head end.

21. The access node according to claim 15, wherein the communication channel is associated with a plurality of logical links to one or more devices to which the data packets are transferred.

22. A method for managing congestion of a communication channel in a communication network, the communication channel carrying a plurality of data streams, each data stream including data packets for transfer over the communication channel, the method comprising:

determining that at least one of the plurality of data streams includes video data;

determining a quality of experience target level and a quality of experience metric associated with a first one of the data streams determined to include video data, the quality of experience metric capable of varying over time;

determining a congestion level of the communication channel, the congestion level based at least on the quality of experience metric, the congestion level varying with the quality of experience metric, wherein the determining the congestion level further includes determining that the quality of experience metric exceeds a predetermined level; and adjusting, if one or more of the data streams is determined to include video data and the determined congestion level is above a predetermined congestion level, a bit rate of the video data of at least one of the data streams so that the data packets associated with the first one of the data streams determined to include video data can be transferred over the communication channel in accordance with the quality of experience target level.

23. The method according to claim 22, wherein adjusting the bit rate of the video data of at least one of the data streams includes adjusting the bit rate of the video data of the first one of the data streams determined to include video data.

24. The method according to claim 22, wherein adjusting the bit rate of the video data of at least one of the data streams includes adjusting the bit rate of the video data of a second one of the data streams determined to include video data.

25. The method according to claim 22, wherein the determined quality of experience metric is based on at least one of a buffer occupancy level metric, a packet discard level metric, and a latency metric associated with the first one of the data streams determined to include video data.

26. An access node that manages congestion in a communication channel of a communication network, the communication channel carrying plurality of data streams, each data stream including data packets for transfer over the communication channel, the access node comprising:

a packet inspection unit configured to inspect one or more of the data packets to determine if at least one of the plurality of data streams includes video data;

a congestion unit coupled to the packet inspection unit, the congestion unit configured to determine a quality of experience target level and a quality of experience metric associated with a first one of the data streams determined to include video data, the quality of experience metric capable of varying over time, the congestion unit further configured to determine a congestion level in the communication channel of the communication network, the congestion level based at least on the quality of experience metric, the congestion level varying with the quality of experience metric, wherein the determination of the congestion level includes determining whether the quality of experience metric exceeds a predetermined level; and a feedback conversion unit coupled to the packet inspection unit and the congestion unit, the feedback conversion unit configured to trigger an adjustment, if one or more of the data streams is determined to include video data and the determined congestion level is above a predetermined congestion level, of a bit rate of the video data of at least one of the data streams so that the data packets associated with the first one of the data streams determined to include video data can be transferred over the communication channel in accordance with the quality of experience target level.

27. The access node according to claim 26, wherein the adjustment of the bit rate of the video data of at least one of the data streams by the feedback conversion unit includes adjusting the bit rate of the video data of the first one of the data streams determined to include video data.

28. The access node according to claim 26, wherein the adjustment of the bit rate of the video data of at least one of the data streams by the feedback conversion unit includes adjusting the bit rate of the video data of a second one of the data streams determined to include video data.

29. The access node according to claim 26, wherein the quality of experience metric determined by the congestion unit is based on at least one of a buffer occupancy level metric, a packet discard level metric, and a latency metric associated with the first one of the data streams determined to include video data.

* * * * *